US008599189B2

(12) United States Patent
Ozawa et al.

(10) Patent No.: US 8,599,189 B2
(45) Date of Patent: Dec. 3, 2013

(54) DISPLAY DEVICE, DISPLAY DATA PROCESSING DEVICE, AND DISPLAY DATA PROCESSING METHOD

(75) Inventors: Atsushi Ozawa, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 961 days.

(21) Appl. No.: 12/591,369

(22) Filed: Nov. 18, 2009

(65) Prior Publication Data

US 2010/0149164 A1 Jun. 17, 2010

(30) Foreign Application Priority Data

Dec. 15, 2008 (JP) ................................ 2008-318216

(51) Int. Cl.
*G06F 3/038* (2013.01)

(52) U.S. Cl.
USPC ................................ 345/212; 345/76; 345/77

(58) Field of Classification Search
USPC ............................................. 345/76, 77, 212
See application file for complete search history.

(56) References Cited

U.S. PATENT DOCUMENTS

2006/0206733 A1 9/2006 Ono
2006/0250385 A1* 11/2006 Plut .............................. 345/211
2008/0158110 A1* 7/2008 Iida et al. ....................... 345/76

FOREIGN PATENT DOCUMENTS

CA 2665420 A1 * 4/2008
JP 2006-236159 9/2006
JP 2007-221821 8/2007
JP 2007-249436 9/2007

* cited by examiner

*Primary Examiner* — Latanya Bibbins
(74) *Attorney, Agent, or Firm* — Rader, Fishman & Grauer PLLC

(57) ABSTRACT

A display device includes: an extraction unit extracting an edge component of a display data signal; an adder unit adding an edge component to the display data signal; a signal generation unit generating a control signal in accordance with the display data signal and an output signal of the adder unit; a correction unit carrying out correction processing on the edge component in accordance with the control signal and outputting the corrected edge component to the adder unit; and a display unit carrying out a display operation in accordance with the output signal of the adder unit.

19 Claims, 19 Drawing Sheets

2

| | | |
|---|---|---|
| 0 | 0 | 0 |
| 1 | -2 | 1 |
| 0 | 0 | 0 |

LATERAL-DIRECTION SECONDARY DIFFERENTIAL

| | | |
|---|---|---|
| 0 | 1 | 0 |
| 0 | -2 | 0 |
| 0 | 1 | 0 |

LONGITUDINAL-DIRECTION SECONDARY DIFFERENTIAL

| | | |
|---|---|---|
| 0 | 1 | 0 |
| 1 | -4 | 1 |
| 0 | 1 | 0 |

LAPLACIAN (NEAR 4)

| | | |
|---|---|---|
| 1 | 1 | 1 |
| 1 | -8 | 1 |
| 1 | 1 | 1 |

LAPLACIAN (NEAR 8)

$$\text{VALUE CORRESPONDING TO POWER} \quad \sum_{i=1}^{\text{NUMBER OF PIXELS}} \left( \frac{\text{GRADATION}}{\text{100\% GRADATION}} \right)^{n}$$

PROCESSING OF EDGE CONTROL COEFFICIENT DETERMINATION UNIT

CONTENT EXAMPLE OF COEFFICIENT CONTROL SIGNAL KC

FIG.12A

| SET NO. | CL(-) |
|---|---|
| CD1 | 63(8bit) |
| CD2 | ×1.25 |
| CD3 | ×1.50 |
| CD4 | ×1.75 |
| CD5 | ×2.00 |
| CD6 | ×2.25 |
| CD7 | ×2.50 |
| CD8 | ×2.75 |
| CD9 | ×3.00 |
| CD10 | ×3.25 |

DEFAULT VALUE → MAXIMUM SET VALUE

FIG.12B

| SET NO. | CL(+) |
|---|---|
| CU1 | 63(8bit) |
| CU2 | ×0.9 |
| CU3 | ×0.8 |
| CU4 | ×0.7 |
| CU5 | ×0.6 |
| CU6 | ×0.5 |
| CU7 | ×0.4 |
| CU8 | ×0.3 |
| CU9 | ×0.2 |
| CU10 | ×0.1 |

DEFAULT VALUE → MAXIMUM SET VALUE

NONLINEAR CORRECTION PROCESSING

PROCESSING OF EDGE CONTROL COEFFICIENT DETERMINATION UNIT

PROCESSING OF EDGE CONTROL COEFFICIENT DETERMINATION UNIT

DISPLAY DEVICE, DISPLAY DATA PROCESSING DEVICE, AND DISPLAY DATA PROCESSING METHOD

BACKGROUND OF THE INVENTION

1. Field of the Invention

The present invention relates to a display device using, for example, an organic EL (Electroluminescence) panel or the like, to a display data processing device embedded in a display device, and to a display data processing method.

2. Description of the Related Art

Flat panel displays are widespread in products, such as computer displays, portable terminals, television receivers, and the like. While a liquid crystal display panel is generally used at present, the narrow viewing angle and the slow response speed of the liquid crystal display panel still continue being pointed out.

An organic EL display using a self-luminous element can overcome the problems of the viewing angle and the response speed, and can also achieve a reduction in thickness with no backlight, high luminance, and high contrast. There are thus expectations that the organic EL display will be the next-generation display device to replace the liquid crystal display.

While organic EL displays have been currently put to practical use, the high power consumption of the organic EL display is still acknowledged as a problem yet.

There is demand for suppression of power consumption which will be commonly confronted by all kinds of display devices.

There is also demand for high image quality and high visibility in various kinds of display devices.

In order to achieve high image quality and high visibility, an image processing method, called edge (contour) enhancement, is used.

This method is generally used to enhance the high-frequency component of an image so as to sharpen the entire image, thus improving image quality. In this case, the improvement in image quality or visibility can be achieved by increasing the contrast feeling of the edge or increasing the luminance of the edge enhanced in the plus direction.

Techniques described in JP-A-2007-221821, JP-A-2007-249436, and JP-A-2006-236159 have been suggested in terms of edge enhancement, high quality, and suppression of power consumption.

JP-A-2007-221821 describes the technique in which the histogram of the edge component for one screen is extracted and the edge enhancement amount is controlled in accordance with the histogram result. This technique enables appropriate edge enhancement processing according to the state of the video.

JP-A-2007-249436 describes the technique in which the gain of the edge enhancement amount, which is effectively used within the range without departing from the dynamic range of the video, is dynamically calculated from the edge component, thereby realizing appropriate edge enhancement processing on the video.

JP-A-2006-236159 describes the technique which causes only an optimum video processing function to be operated and an unnecessary video processing function to be not operated in accordance with the application use state, thereby realizing the suppression of power consumption.

SUMMARY OF THE INVENTION

Here, self-luminous displays, such as an organic EL display and the like, are considered.

In the self-luminous displays, higher average display luminance within the screen leads to higher power consumption. Thus, it is difficult to achieve high image quality and low power consumption for bright and clear display at present.

For example, in the case of the LCD display, power consumption is substantially determined by the luminance of the backlight, and even if image processing, such as edge enhancement, described in JP-A-2007-221821 and JP-A-2007-249436 is performed, power consumption remains unchanged. Meanwhile, among flat panel displays, the self-luminous devices, such as an organic EL display and a PDP (Plasma Display), are influenced by the increase/decrease in power consumption. That is, in the case of the organic EL display, image quality can be improved by edge enhancement, but an increase in luminance of the portion subjected to edge enhancement leads to an increase in power consumption. This conflicts with the demand for suppression of power consumption.

The technique described in JP-A-2006-236159 realizes low power consumption by stopping the operation of the unnecessary function, but it may be impossible to realize low power consumption while the function is operating. That is, in order to realize low power consumption, the function, such as edge enhancement or the like, must be stopped. Consequently, according to this technique, it may be impossible to achieve high image quality and visibility along with reduction in power consumption in the organic EL display.

As described above, while edge enhancement may be appropriately performed in accordance with the state of the image, in the case of the self-luminous display, it may be impossible to suppress power consumption. Further, in order to suppress power consumption, the function for high image quality must be stopped. That is, there is no technique which can realize edge enhancement processing while reducing power consumption.

Thus, there is a need for a technique which can suppress an increase in power consumption while maintaining or improving visibility by edge enhancement.

According to an embodiment of the invention, there is provided a display device including an extraction unit extracting an edge component of a display data signal, an adder unit adding an edge component to the display data signal, a signal generation unit generating a control signal in accordance with the display data signal and an output signal of the adder unit, a correction unit carrying out correction processing on the edge component in accordance with the control signal and outputting the corrected edge component to the adder unit, and a display unit carrying out a display operation in accordance with the output signal of the adder unit.

The signal generation unit may generate the control signal in accordance with the calculation results of light-emission power consumption when the display data signal is supplied to the display unit and light-emission power consumption when the output signal of the adder unit is supplied to the display unit.

The correction unit may set the edge enhancement amounts in the plus and minus directions of the edge component and then perform the correction processing.

The control signal may variably control at least one of the clip levels in the plus and minus directions of the edge component in the correction unit, and the correction unit may perform the correction processing by coefficient operation using a plus edge coefficient and a minus edge coefficient determined by the clip levels in the plus and minus directions in the set state based on the control signal.

The signal generation unit may generate the control signal which preferentially variably controls the clip level in the minus direction of the edge component in the correction unit to be decreased, and if needed after the clip level in the minus direction is decreased to a predetermined level, variably controls the clip level in the plus direction of the edge component in the correction unit to be decreased.

The signal generation unit may generate the control signal which preferentially variable controls the clip level in the plus direction of the edge component in the correction unit to be decreased, and if needed after the clip level in the plus direction is decreased to a predetermined level, variably controls the clip level in the minus direction of the edge component in the correction unit to be decreased.

The signal generation unit may generate the control signal which decreases the clip levels in the plus and minus directions of the edge component in the correction unit at the same time.

The signal generation unit may variably control one of the clip levels in the plus and minus directions of the edge component in the correction unit by using the control signal.

According to another embodiment of the invention, there is provided a display data processing device including an extraction unit extracting an edge component of a display data signal, an adder unit adding an edge component to the display data signal, a signal generation unit generating a control signal in accordance with the display data signal and an output signal of the adder unit, and a correction unit carrying out correction processing on the edge component in accordance with the control signal and outputting the corrected edge component to the adder unit.

According to the embodiments of the invention, the edge enhancement amount in the plus direction and the edge enhancement amount in the minus direction are controlled separately such that light-emission power consumption estimated and calculated from the output display data signal must be lower than light-emission power consumption estimated and calculated from the input display data signal, without depending on the degree of edge enhancement and the content of the video signal. Therefore, an increase in power consumption which is a drawback inherent in self-luminous displays can be prevented while the visibility improvement effect of the edge enhancement processing can be maintained.

As described above, in the case of self-luminous displays, image quality is improved by edge enhancement, but an increase in the luminance of the edge portion leads to an increase in power consumption.

It should be noted that while the edge component in the plus direction causes an increase in luminance and thus an increase in power consumption, the edge component in the minus direction causes a decrease in luminance and thus a decrease in power consumption.

In the case of normal edge enhancement, the pre-edge and the over-edge are attached evenly to the gradation. In general, however, the normal display panel module is configured such that the gamma characteristic representing a change in luminance with respect to the gradation of the input video signal is close to the power of 2.2. This is because the image capturing/receiving mechanism constructed to match with the characteristics of the CRT is continued as it is up until the present. As a result, in the case of the self-luminous display, an increase in power consumption by edge enhancement in the plus direction is larger than a decrease in power consumption by edge enhancement in the minus direction. For this reason, even if the pre-edge and the over-edge in the video signal are enhanced by the same amount, this causes an increase in power consumption.

In contrast, according to the embodiments of the invention, asymmetric enhancement is made such that an edge in the minus direction is larger than an edge in the plus direction, thus suppressing an increase in power consumption. Therefore, edge enhancement is realized without causing an increase in power consumption.

According to the embodiments of the invention, an increase in power consumption which is a drawback inherent in the self-luminous display can be reliably suppressed while the image quality/visibility improvement effect by the edge enhancement processing can be maintained.

BRIEF DESCRIPTION OF THE DRAWINGS

FIGS. 12A and 12B are explanatory views of the content of a coefficient control signal according to an embodiment of the invention.

DESCRIPTION OF PREFERRED EMBODIMENTS

Hereinafter, an embodiment of the invention will be described in the following sequence.

[1. Configuration of Display Device]

[2. Configuration of Display Data Processing Unit]

[3. Edge Enhancement with Suppressed Power Consumption by Display Data Processing Unit]

[4. Another Example of Edge Control Coefficient Determination Processing]

[5. Modification]

[1. Configuration of Display Device]

Figure 1:
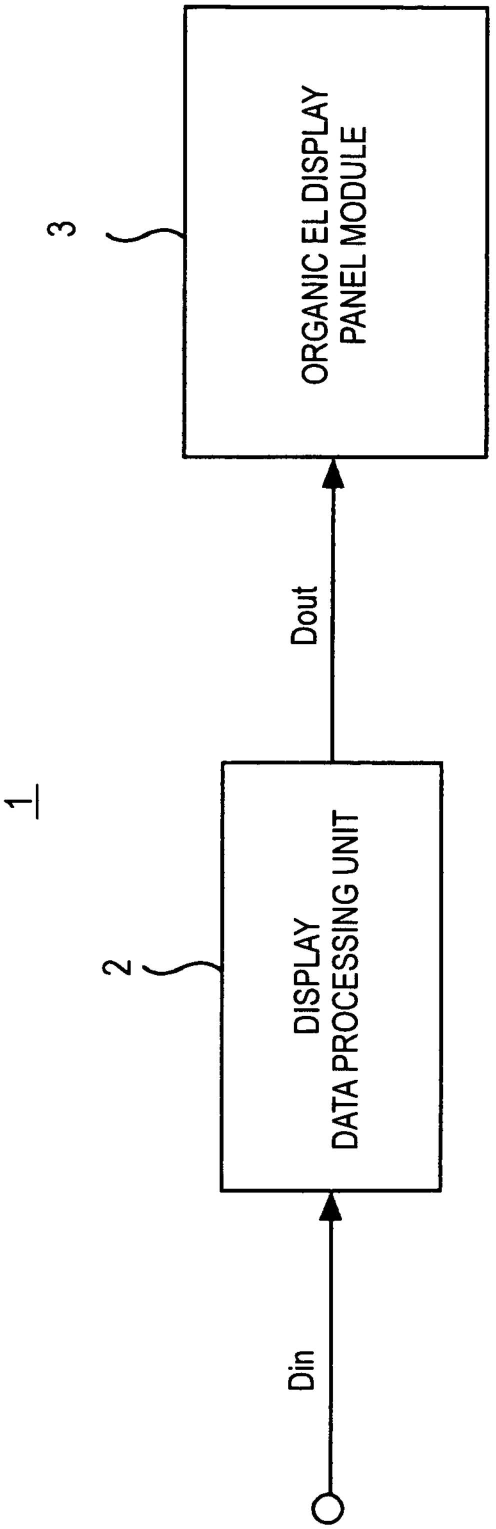
FIG. 1 is a block diagram of the main portions of a display device according to an embodiment of the invention.

FIG. 1 shows the configuration of the main portions of a display device according to an embodiment of the invention. A display device 1 of this embodiment has an organic EL display panel module 3 which uses an organic EL element as a light-emitting element.

A display data processing unit 2 is provided which processes a display data signal supplied to the organic EL display panel module 3. The display data processing unit 2 performs the below-described processing on a display data signal Din, and supplies a display data signal Dout after the processing to the organic EL display panel module 3.

The organic EL display panel module 3 will be described with reference to FIGS. 2 and 3.

Figure 2:
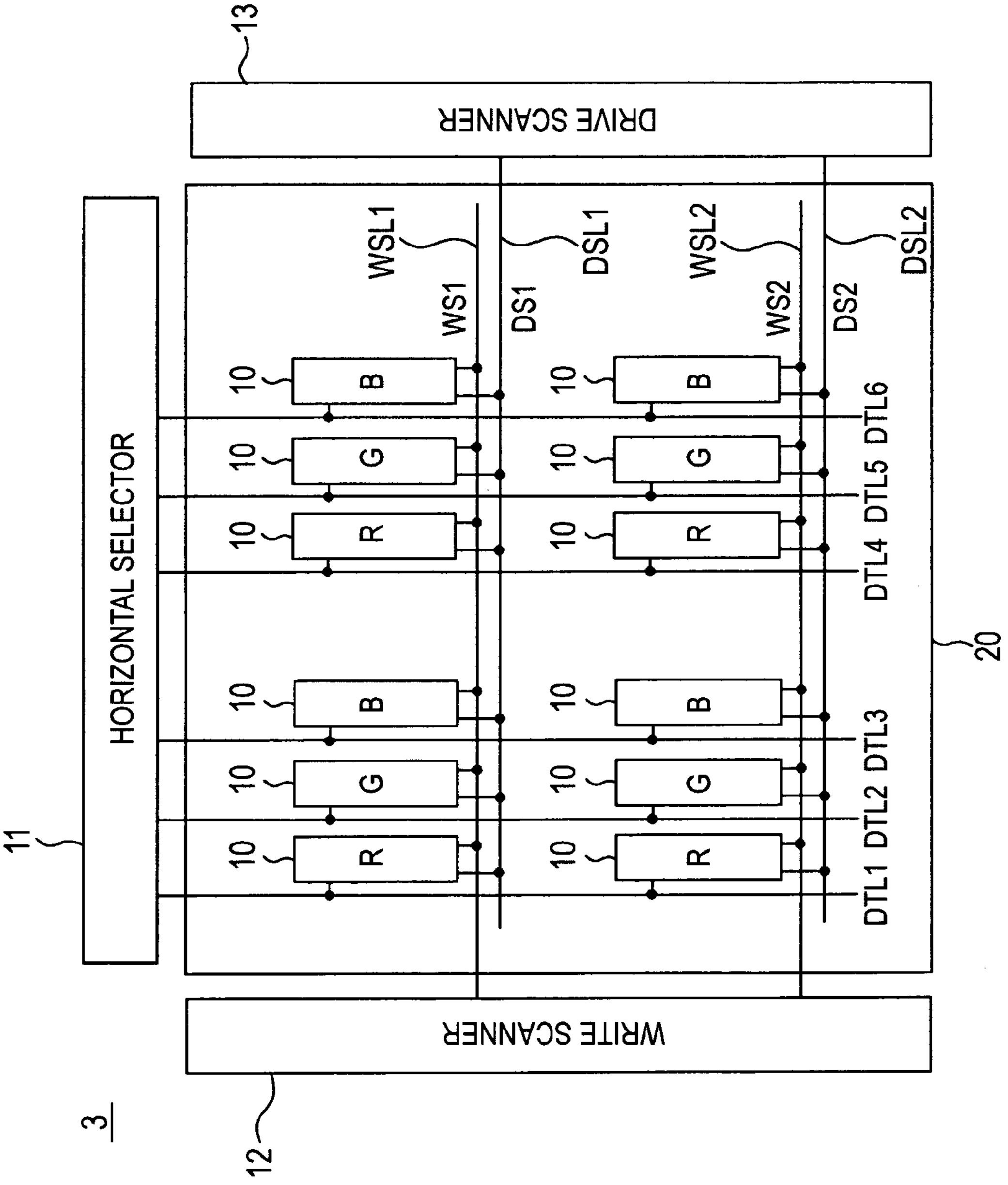
FIG. 2 is an explanatory view of an organic EL display panel module according to an embodiment of the invention.

FIG. 2 shows an example of the configuration of the organic EL display panel module 3. The organic EL display panel module 3 uses an organic EL element as a light-emitting element, and includes pixel circuits 10 which carry out a light-emission operation in an active matrix system.

As shown in FIG. 2, the organic EL display panel module 3 has a pixel array section 20 in which the pixel circuits 10 are arranged in a matrix of rows and columns. The pixel circuits 10 are marked with “R”, “G”, and “B”, which represents that light-emitting pixels correspond to respective colors of R (red), G (green), and B (blue).

In order to drive the pixel circuits 10 of the pixel array section 20, a horizontal selector (data driver) 11, a write scanner 12, and a drive scanner (drive control scanner) 13 are provided.

In the pixel array section 20, signal lines DTL1, DTL2, . . . which are selected by the horizontal selector 11 and supply a video signal based on luminance information as an input signal to the pixel circuits 10 are arranged in columns. The signal lines DTL1, DTL2, . . . are arranged by the number of columns of the pixel circuits 10 arranged in a matrix in the pixel array section 20.

In the pixel array section 20, write control lines WSL1, WSL2, . . . and power control lines DSL1, DSL2, . . . are arranged in rows. The write control lines WSL and the power control lines DSL are respectively arranged by the number of rows of the pixel circuits 10 arranged in a matrix in the pixel array section 20.

The write control lines WSL (WSL1, WSL2, . . . ) are driven by the write scanner 12. The write scanner 12 sequentially supplies scanning pulses WS (WS1, WS2, . . . ) to the write control lines WSL1, WSL2, . . . arranged in rows at a predetermined timing, and line-sequentially scans the pixel circuits 10 in terms of rows.

The power control lines DSL (DSL1, DSL2, . . . ) are driven by the drive scanner 13. The drive scanner 13 supplies power pulses DS (DS1, DS2, . . . ) as a power supply voltage, which is switched between two values of a drive potential (Vcc) and an initial potential (Vini), to the power control lines DSL1, DSL2, . . . arranged in rows in matching with line-sequential scanning by the write scanner 12.

The horizontal selector 11 supplies a signal potential (Vsig) and a reference potential (Vofs), which are input signals to the pixel circuits 10, to the signal lines DTL1, DTL2, . . . arranged in columns in matching with line-sequential scanning by the write scanner 12.

Figure 3:
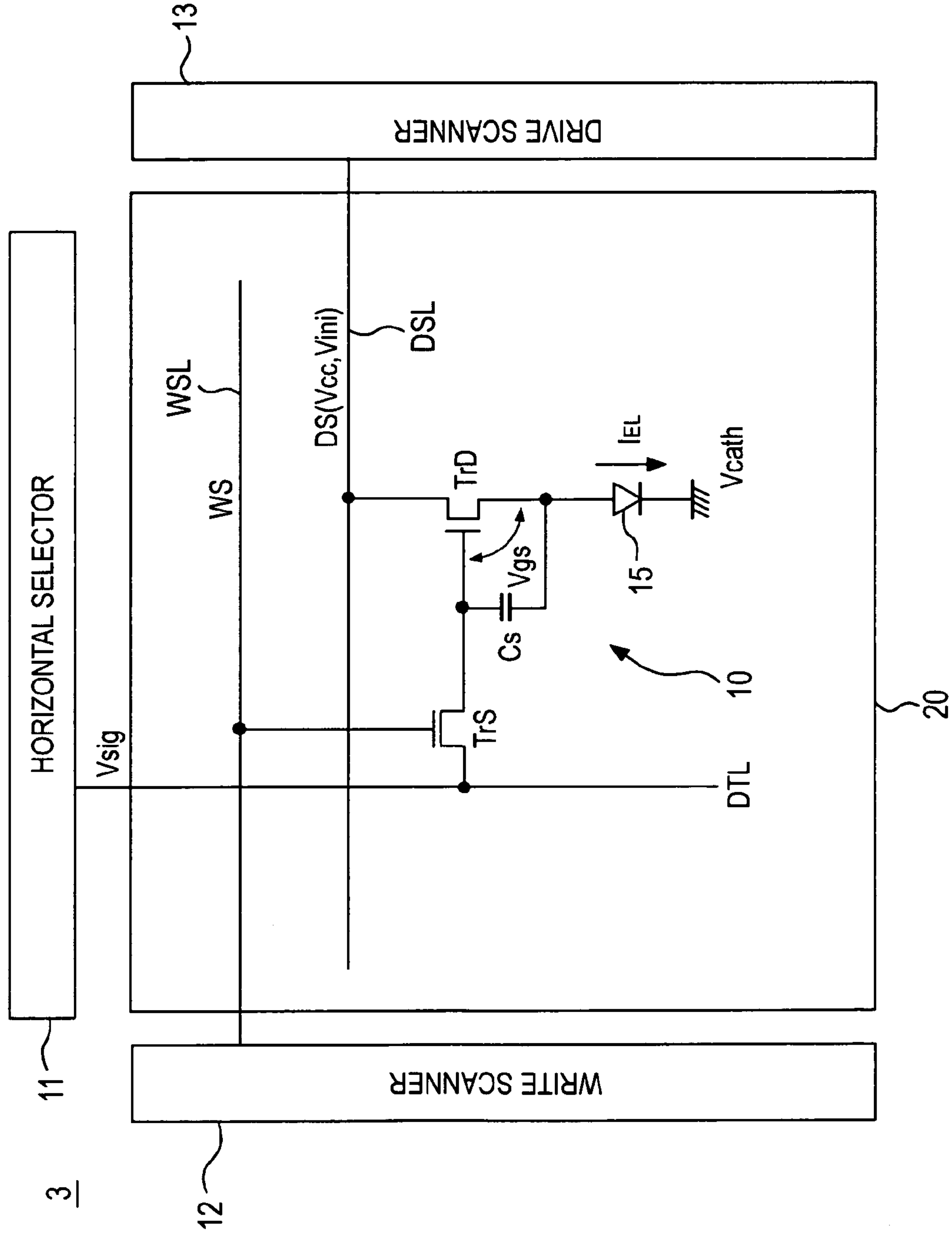
FIG. 3 is an explanatory view of a pixel circuit in an organic EL display panel module according to an embodiment of the invention.

FIG. 3 shows the configuration of the pixel circuit 10. The pixel circuit 10 is arranged in a matrix, like the pixel circuits 10 shown in FIG. 2. For simplification, FIG. 3 shows only one pixel circuit 10 which is arranged at an intersection of the signal line DTL, and the write control line WSL and the power control line DSL.

The pixel circuit 10 includes an organic EL element 15 as a light-emitting element, one holding capacitor Cs, and two thin film transistors (TFTs), that is, a sampling transistor TrS and a drive transistor TrD. The sampling transistor TrS and the drive transistor TrD are n-channel TFTs.

The holding capacitor Cs has one terminal connected to the source of the drive transistor TrD and the other terminal connected to the gate of the drive transistor TrD.

The light-emitting element of the pixel circuit 10 is the organic EL element 15 with a diode structure, and has an anode and a cathode. The anode of the organic EL element 15 is connected to the source S of the drive transistor TrD, and the cathode of the organic EL element 15 is connected to a predetermined ground line (cathode potential Vcath).

The sampling transistor TrS has one of a source and a drain connected to the signal line DTL, and the other of the source and the drain connected to the gate of the drive transistor TrD. The sampling transistor TrS has a gate connected to the write control line WSL.

The drive transistor TrD has a drain connected to the power control line DSL.

Light-emission driving of the organic EL element 15 is basically carried out as follows.

When the signal potential Vsig is applied to the signal line DTL, the sampling transistor TrS conducts in response to the scanning pulse WS supplied from the write scanner 12 through the write control line WSL. When this happens, the input signal Vsig from the signal line DTL is written to the holding capacitor Cs. The drive transistor TrD is supplied with a current through the power control line DSL to which the drive potential V1 is supplied from the drive scanner 13, and causes a current IEL corresponding to the signal potential held in the holding capacitor Cs to flow in the organic EL element 15, thus causing the organic EL element 15 to emit light.

That is, during each frame period, a pixel signal value (gradation value) is written to the holding capacitor Cs, and accordingly the gate-source voltage Vgs of the drive transistor TrD is determined by the gradation value. The drive transistor TrD which operates in the saturation region functions as a constant current source for the organic EL element 15, and causes the current IEL corresponding to the gate-source voltage Vgs to flow in the organic EL element 15. Thus, the organic EL element 15 emits light with luminance corresponding to the gradation value.

[2. Configuration of Display Data Processing Unit]

The configuration of the display data processing unit 2 will be described.

In this embodiment, as shown in FIG. 1, the display data signal Din is subject to necessary processing in the display data processing unit 2, and the display data signal Dout after the processing is supplied to the organic EL display panel module 3.

In the organic EL display panel module 3, the display data signal Dout is supplied to the horizontal selector 11 of FIG. 2. The horizontal selector 11 supplies the signal value Vsig for each pixel based on the display data signal Dout to each pixel circuit 10.

The processing of the display data processing unit 2 performs edge enhancement processing on the display data signal, thus achieving high image quality and improving visibility, and also sets the edge enhancement amount in the plus direction and the edge enhancement amount in the minus direction with respect to the waveform of the edge component at the time of edge enhancement and then performs edge waveform correction processing. With this processing, power consumption in the organic EL display panel module 3 is reduced.

Figure 4:
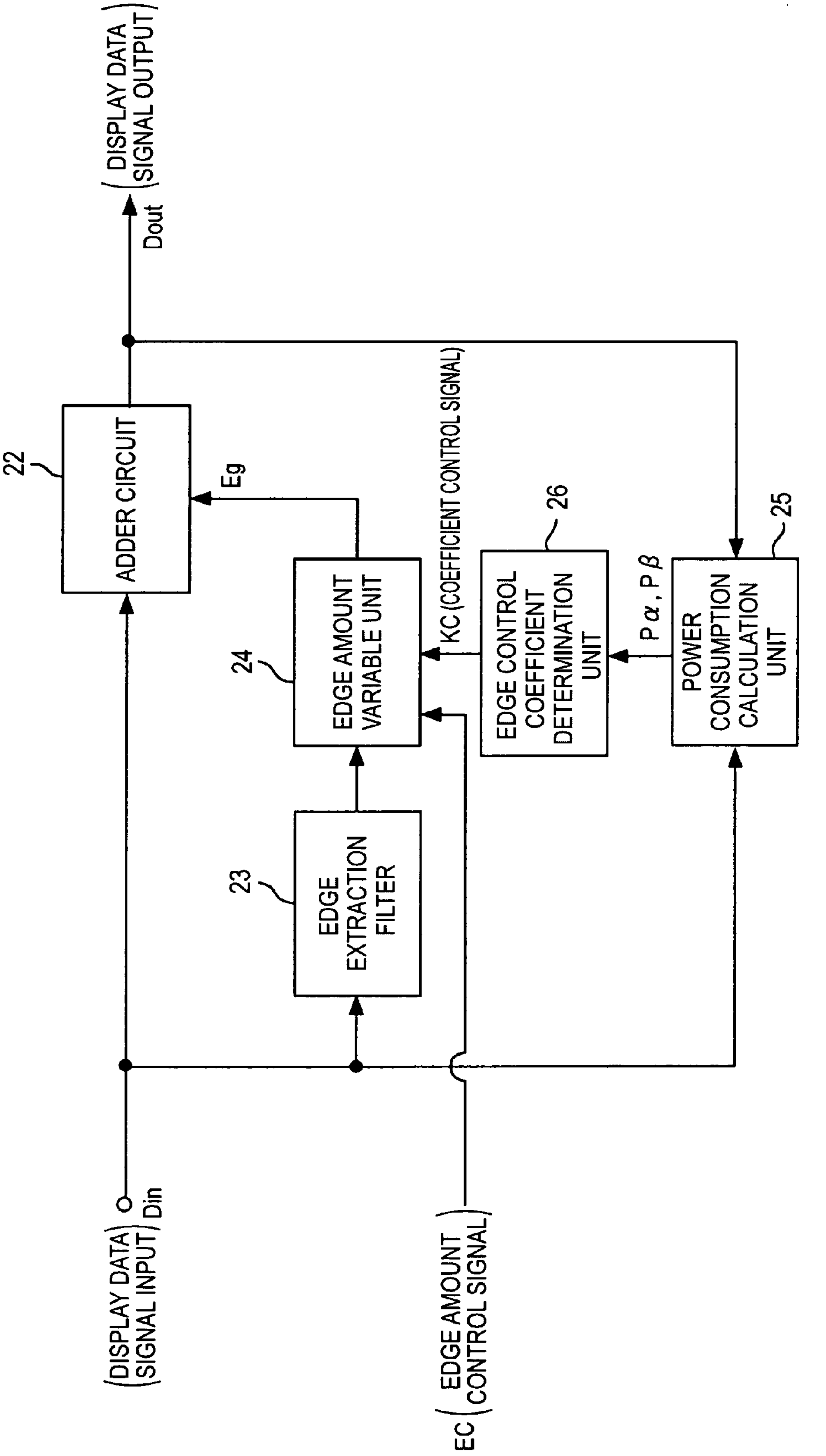
FIG. 4 is a block diagram of a display data processing unit according to an embodiment of the invention.

FIG. 4 shows a configuration example of the display data processing unit 2.

The display data processing unit 2 includes an adder circuit 22, an edge extraction filter 23, an edge amount variable unit 24, a power consumption calculation unit 25, and an edge control coefficient determination unit 26.

The display data signal Din is input to the adder circuit 22, the edge extraction filter 23, and the power consumption calculation unit 25.

The edge extraction filter 23 extracts an edge component (high-frequency component) of the display data signal Din.

Figures 5A, 5B:
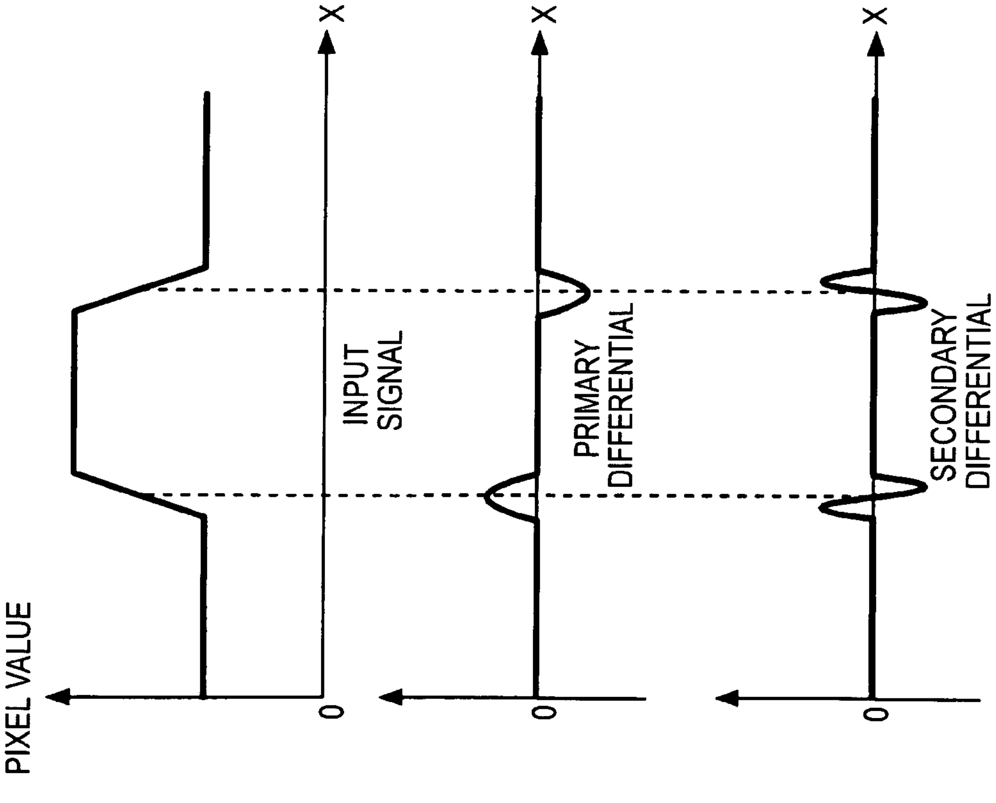
FIGS. 5A and 5B are explanatory views of an edge extraction filter according to an embodiment of the invention.

FIG. 5A shows an example of edge extraction by the edge extraction filter 23. In general, as a filter for extracting an edge (high-frequency component), a secondary differential filter (also referred to as High Pass Filter (HPF)) is used in order to enhance both a preshoot and an overshoot. The edge extraction filter 23 extracts a secondary differential waveform with respect to the edge of the input signal (display data signal Din), as shown in FIG. 5A.

As an example of the secondary differential filter, as shown in FIG. 5B, although neighborhood data around a target pixel is used, a digital filter in only the lateral direction: lateral-direction secondary differential, in only the longitudinal direction: longitudinal-direction secondary differential, in both the longitudinal and lateral directions: Laplacian (near 4), or in both the obliquely lateral and longitudinal directions: Laplacian (near 8) is generally used in consideration of the spatial direction.

The edge amount variable unit 24 performs correction processing on the edge component output from the edge extraction filter 23 on the basis of a coefficient control signal KC from the edge control coefficient determination unit 26. The level of the edge amount is varied on the basis of an edge amount control signal EC supplied from a control system (not shown).

The edge amount control signal EC is supplied as a required value from the control system (not shown) by an operation of a user on the display device 1 or processing on an application program. The edge amount control signal EC controls the degree of edge enhancement.

Figure 6A:
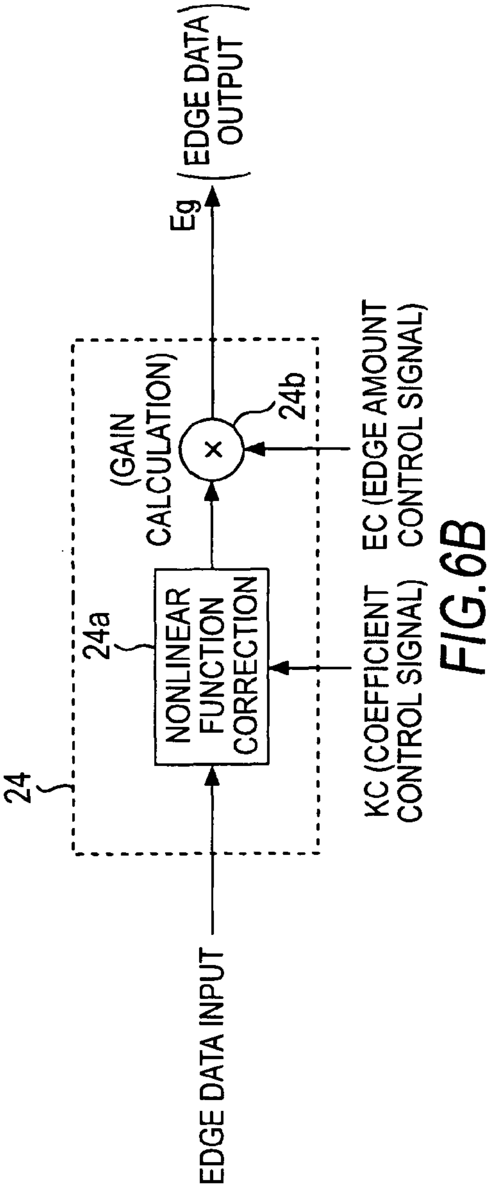
FIGS. 6A and 6B are explanatory views of an edge amount variable unit according to an embodiment of the invention.

FIG. 6A shows an example of the edge amount variable unit 24.

The edge amount variable unit 24 has a nonlinear function correction circuit 24*a* and a gain calculation circuit 24*b*. The nonlinear function correction circuit 24*a* is used for two main purposes, noise enhancement suppression and preshoot/overshoot (large-amplitude edge enhancement) suppression. The noise enhancement suppression is called coring, and the preshoot/overshoot suppression is called clipping.

Figure 6B:
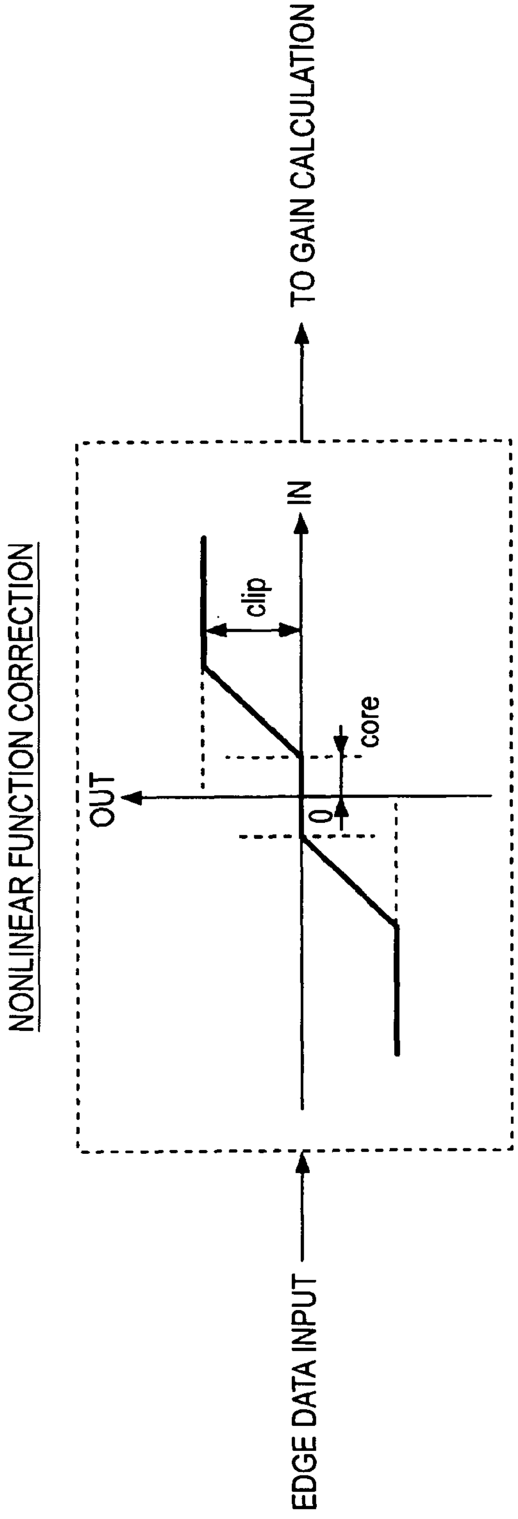

FIG. 6B shows aspects of typical coring and clipping.

As shown in FIG. 6B, an edge to be output is limited by two parameters, “core” and “clip”, in accordance with the extracted edge amount.

The parameter “core” for coring is determined in accordance with the noise amount.

The parameter “clip” for clipping is determined so as to suppress large-amplitude edge enhancement.

Both parameters are generally given as fixed values and used to suppress deterioration in image quality due to edge enhancement. The optimum values of both parameters are determined on the basis of an image.

In this embodiment, the clip level according to the parameter “clip” is variably controlled by the coefficient control signal KC of the edge control coefficient determination unit 26. Thus, the nonlinear function correction circuit 24*a* sets the edge enhancement amounts in the plus and minus directions with respect to the waveform of the edge component and then performs edge waveform correction processing. The details will be described below.

The gain calculation circuit 24*b* multiplies the edge component corrected by the nonlinear function correction circuit 24*a* by the input edge amount control signal EC. The edge amount added to the display data signal is controlled by multiplication of the edge amount control signal EC. For example, the degree of edge enhancement is adjusted in accordance with a user’s preference or the like.

The output of the gain calculation circuit 24*b* is supplied to the adder circuit 22 of FIG. 4 as edge data Eg.

The adder circuit 22 adds edge data Eg to the input display data signal.

That is, edge data Eg is added to the display data signal so as to obtain the edge-enhanced display data signal Dout. The display data signal Dout is supplied to the organic EL display panel module 3.

The display data signal Din and the display data signal Dout are supplied to the power consumption calculation unit 25. The power consumption calculation unit 25 estimates and calculates light-emission power consumption caused by the respective input display data signals Din and Dout for each frame. The calculated light-emission power consumption $P\alpha$ and $P\beta$ are output to the edge control coefficient determination unit 26.

The edge control coefficient determination unit 26 generates the coefficient control signal KC, which is given to the edge amount variable unit 24, on the basis of the estimated light-emission power consumption $P\alpha$ caused by the display data signal Din and the estimated light-emission power consumption $P\beta$ caused by the display data signal Dout supplied from the power consumption calculation unit 25, and outputs the coefficient control signal KC.

For example, the edge control coefficient determination unit 26 generates the coefficient control signal KC on the basis of the comparison result of the estimated power consumption $P\alpha$ and $P\beta$.

Specific examples of the processing of the power consumption calculation unit 25 and the edge control coefficient determination unit 26 will be described below. Note here that, the coefficient control signal KC controls a clip level in the nonlinear function correction circuit 24*a* of FIG. 6B.

The nonlinear function correction circuit 24*a* sets the edge enhancement amount in the plus direction and the edge enhancement amount in the minus direction on the basis of the coefficient control signal KC and then performs the edge waveform correction processing. Thus, control is performed such that light-emission power consumption estimated and calculated from the output display data signal must be lower than light-emission power consumption estimated and calculated from the input display data signal, without depending the degree of edge enhancement and the content of the video signal.

Figure 7A:
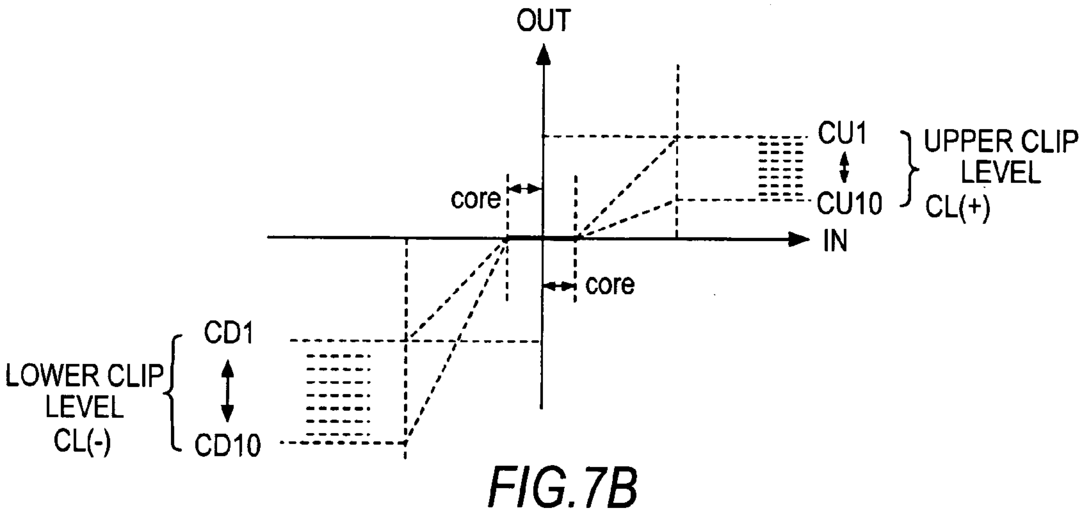
FIGS. 7A to 7C are explanatory views of changes in the set values of nonlinear function correction characteristics according to an embodiment of the invention.
Figure 7B:
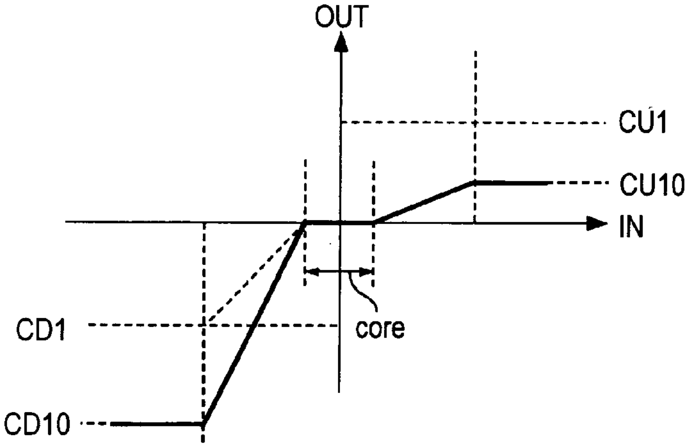
Figure 7C:
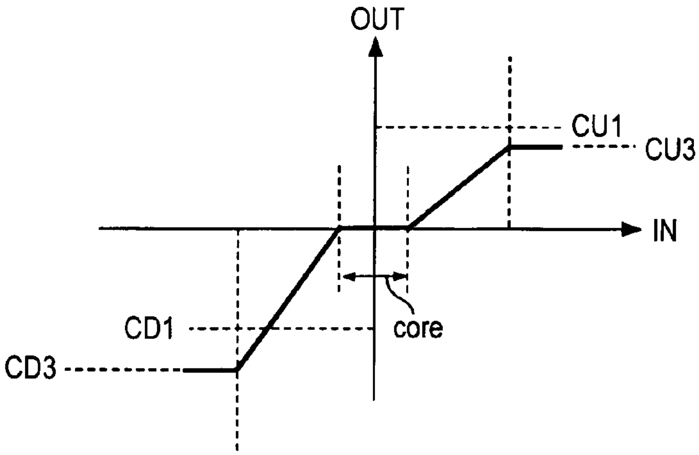

FIGS. 7A to 7C show examples of variable control of the clip level in the nonlinear function correction circuit 24*a*.

Although as described above, the clip level is set as the parameter “clip” for clipping, in this embodiment, the plus-side clip level and the minus-side clip level are variably set separately. Hereinafter, the plus-side clip level is called "upper clip level CL(+)" and the minus-side clip level is called "lower clip level CL(−)".

For example, in the initial state, the upper and lower clip levels in the nonlinear function correction circuit 24*a* are set as shown in FIG. 6B.

In this embodiment, it is assumed that, as shown in FIG. 7A, the lower clip level CL(−) is variably set in ten steps of "CD1" to "CD10", and the upper clip level CL(+) is variably set in ten steps of "CU1" to "CU10".

Although the example where the upper and lower clip levels CL(+) and CL(−) are respectively variably set in ten steps will continue to be described below, the number of variable steps as ten is just an example. What is necessary is that the number of variable steps is a plural number. The number of variable steps of the upper clip level CL(+) and the number of variable steps of the lower clip level CL(−) do not have to be identical.

The level differences between the steps are appropriately set, and the level intervals between the steps do not have to be identical. The level difference between the steps of the lower clip level CL(−) and the level difference between the steps of the upper clip level CL(+) do not have to be identical.

The initial state shown in FIG. 6B means a state where in FIG. 7A, CD1 is set as the lower clip level CL(−) and CU1 is set as the upper clip level CL(+). As the absolute value, the relationship CD1=CU1 is established.

In this embodiment, the lower clip level CL(−) and the upper clip level CL(+) are variably controlled by the coefficient control signal KC.

For example, FIG. 7B shows a state where the lower clip level CL(−) and the upper clip level CL(+) are respectively controlled to CD10 and CU10 by the coefficient control signal KC. In this case, the nonlinear function correction circuit 24*a* performs correction processing on the edge component in accordance with the characteristic indicated by the bold line.

FIG. 7C shows a state where the lower clip level CL(−) and the upper clip level CL(+) are respectively controlled to CD3 and CU3 by the coefficient control signal KC. In this case, the nonlinear function correction circuit 24*a* performs correction processing on the edge component in accordance with the characteristic indicated by the bold line.

In this embodiment, the edge component is corrected with the clip levels variably set. Then, the adder circuit 22 adds the edge component to the display data signal, so visibility can be improved by edge enhancement and power consumption of the organic EL display panel module 3 can be suppressed or reduced.

Referring to FIGS. 4, 5A, and 5B, the adder circuit 22 corresponds to an "adder unit" described in the appended claims.

The edge extraction filter 23 corresponds to an "extraction unit" described in the appended claims, and the edge amount variable unit 24 (especially, the nonlinear function correction circuit 24*a*) corresponds to a "correction unit" described in the appended claims.

The power consumption calculation unit 25 and the edge control coefficient determination unit 26 correspond to a "signal generation unit" described in the appended claims. A "control signal" described in the appended claims is the coefficient control signal KC.

[3. Edge Enhancement with Suppressed Power Consumption by Display Data Processing Unit]

In the display data processing unit 2 configured as above, asymmetric enhancement is made such that the edge in the minus direction is larger than the edge in the plus direction, so an increase in power consumption of the organic EL display panel module 3 can be suppressed. That is, the edge enhancement function is realized without causing an increase in power consumption.

Edge enhancement processing with suppressed power consumption by the display data processing unit 2 will be described.

As described above, the power consumption calculation unit 25 estimates and calculates power consumption (light-emission power consumption) for one screen caused by the display data signals Din and the Dout. The light-emission power consumption caused by the display data signal Din means power consumption for one frame when the display data signal Din is given to the organic EL display panel module 3 so as to emit light. The light-emission power consumption caused by the display data signal Dout means power consumption for one frame when the display data signal Dout is given to the organic EL display panel module 3 so as to emit light.

First, a method of estimating and calculating light-emission power consumption will be described.

First, as described with reference to FIG. 3, in the pixel circuit 10 of the organic EL display panel module 3, a current flows in the organic EL element 15 so as to emit light.

The relationship between the light-emission current and luminance is represented by the I-L characteristic. In general, the light-emission current and luminance have a proportional relationship. For this reason, a current that will flow in accordance with necessary luminance is determined uniquely.

The current IEL necessary for light-emission flows from a voltage source Vcc (the drive potential Vcc given to the power control line DSL of FIG. 3) into the cathode (the anode of Vcath), so the organic EL element 15 emits light. Therefore, power consumption PEL concerning light-emission of the organic EL element 15 is expressed as follows.

$$PEL=(Vcc-Vcath)\times IEL$$

In general, the drive potential Vcc and the cathode potential Vcath are constant. Therefore, if the current IEL according to video data (gradation value) can be obtained, power consumption can be estimated and calculated.

Figure 8:
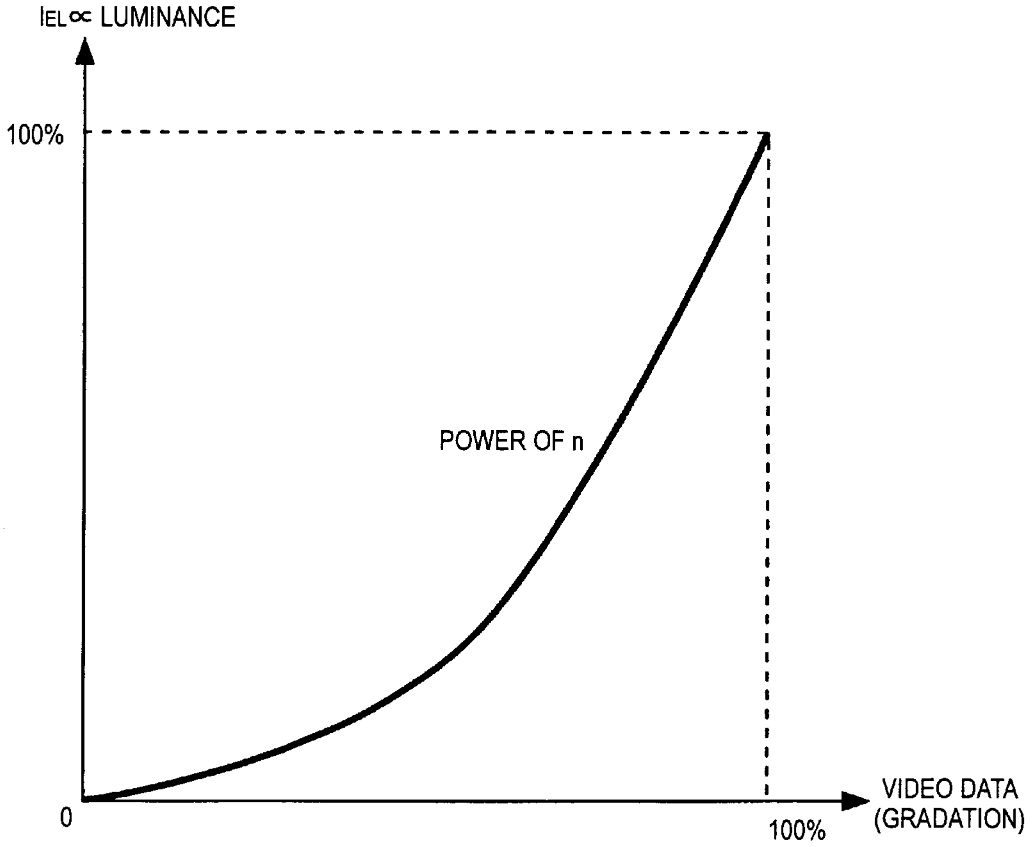
FIG. 8 is an explanatory view of a power calculation method according to an embodiment of the invention.

In general, in the case of a display device, the relationship between the light-emission current and video data is adjusted so as to be an exponential function, as shown in FIG. 8. In the case of a television monitor, the power of 2.2 is typically used.

That is, if information (the power of n) about the gamma characteristic has been obtained in advance, data corresponding to the current can be converted from video data. This conversion is carried out by operation or table conversion.

In general, each pixel in the display has subpixels of three RGB colors, so it is also necessary to obtain information about a necessary current ratio when light-emission is carried out on the basis of reference white.

The calculation results of $(\text{gradation}/100\%\ \text{gradation})^n$ for the respective subpixels summed at the reference white current ratio, and the average value is calculated, thus calculating the amount corresponding power consumption of each pixel. This is carried out for all the pixels, and the average value is calculated.

By comparing this value with a relative value, the increase/decrease rate of power consumption can be calculated.

A specific example of calculation of light-emission power consumption by the power consumption calculation unit 25 will be described with reference to FIG. 9.

Figure 9:
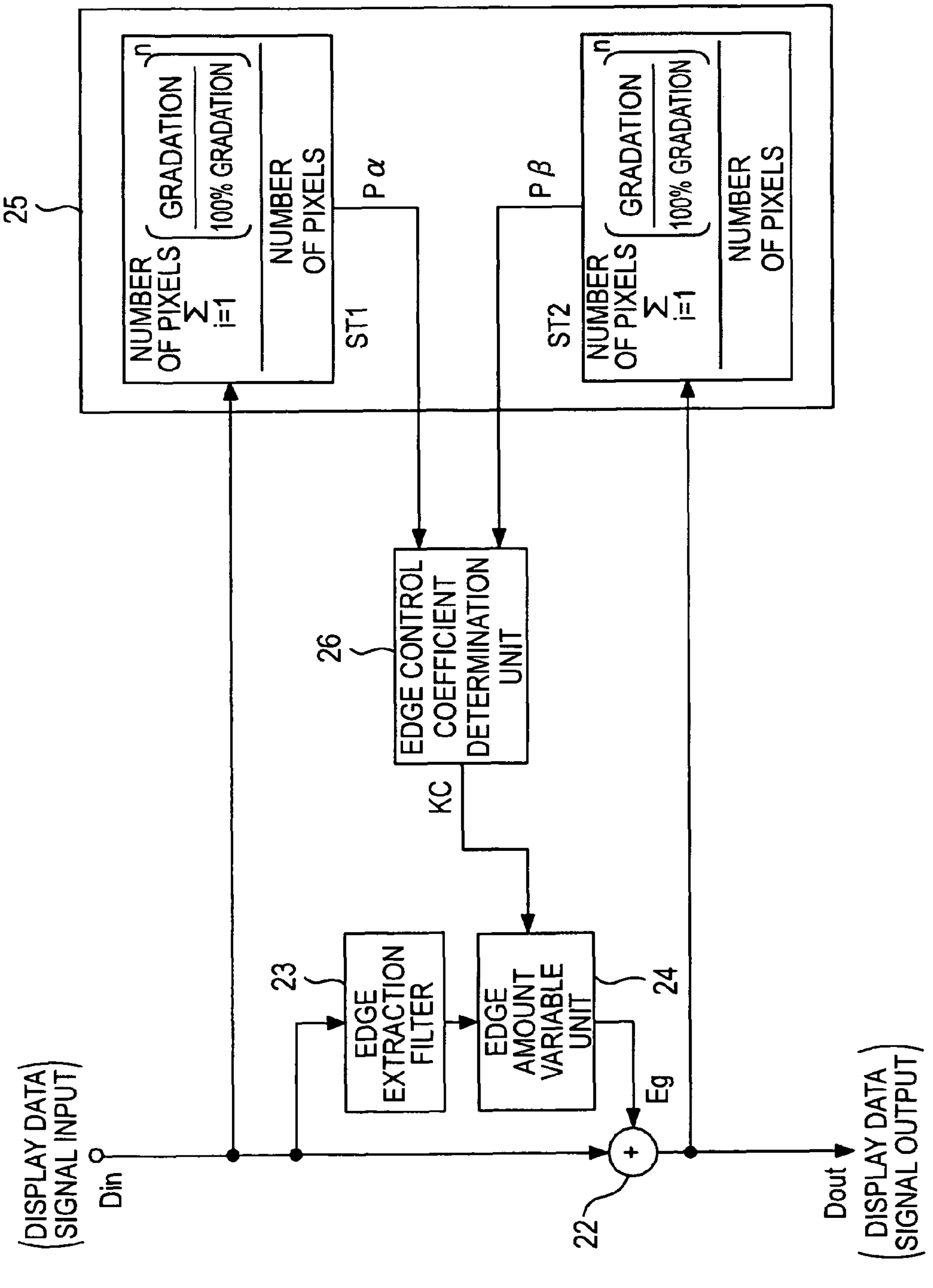
FIG. 9 is an explanatory view of calculation of light-emission power consumption according to an embodiment of the invention.

FIG. 9 shows a specific example of the operation content of the power consumption calculation unit 25 in FIG. 4.

As a process ST1, the power consumption calculation unit 25 estimates and calculates light-emission power consumption Pα caused by the display data signal Din.

As a process ST2, the power consumption calculation unit also estimates and calculates light-emission power consumption Pβ caused by the display data signal Dout.

The light-emission power consumption Pα and Pβ are power parameters for one screen estimated and calculated from the display data signal Din and the display data signal Dout, respectively.

Specifically, the integration value ($\Sigma\{(\text{gradation}/100\%\ \text{gradation})^n\}$) of $(\text{gradation}/100\%\ \text{gradation})^n$ for all the pixels is divided by the number of pixels so as to calculate the average value. That is, the following equations are calculated.

$$P\alpha=(\Sigma\{(\text{Gradation}/100\%\ \text{Gradation})^n\})/\text{Number of Pixels}$$

$$P\beta=(\Sigma\{(\text{Gradation}/100\%\ \text{Gradation})^n\})/\text{Number of Pixels}$$

The gradation is the value of a display data signal corresponding to each pixel, and the 100% gradation is the value of a display data signal with the maximum luminance. n is the power of n shown in FIG. 8.

Therefore, with regard to the signal value (gradation) of each pixel in one frame, power consumption of each pixel is estimated by $(\text{Gradation}/100\%\ \text{Gradation})^n$, and power consumption is integrated for all the pixels. The integration value is divided by the number of pixels so as to obtain the average value, so light-emission power consumption per pixel is calculated.

The conversion may be carried out by using the above-described equation or by using a table in which only a portion for exponential calculation is set in advance.

Incidentally, in the case of the RGB subpixels, the calculation is carried out as follows.

Let the current ratio of RGB for light-emission of reference white be 1:2:3, then, the following equation is obtained.

$$P\alpha=(\Sigma([1\times\{(R\ \text{Gradation}/100\%\ \text{Gradation})n\}+2\times\{(G\ \text{Gradation}/100\%\ \text{Gradation})n\}+3\times\{(B\ \text{Gradation}/100\%\ \text{Gradation})n\}]/(1+2+3)))/\text{Number of Pixels}$$

After the light-emission power consumption Pα and Pβ are calculated in such a manner, the edge control coefficient determination unit 26 generates the coefficient control signal KC on the basis of the light-emission power consumption Pα and Pβ.

Prior to describing specific examples of processing in the edge control coefficient determination unit 26 and the nonlinear function correction circuit 24*a* in the edge amount variable unit 24, for ease of understanding, the relationship between the edge enhancement processing and power consumption and the power consumption suppression effect will be described with reference to FIG. 10.

Figure 10:
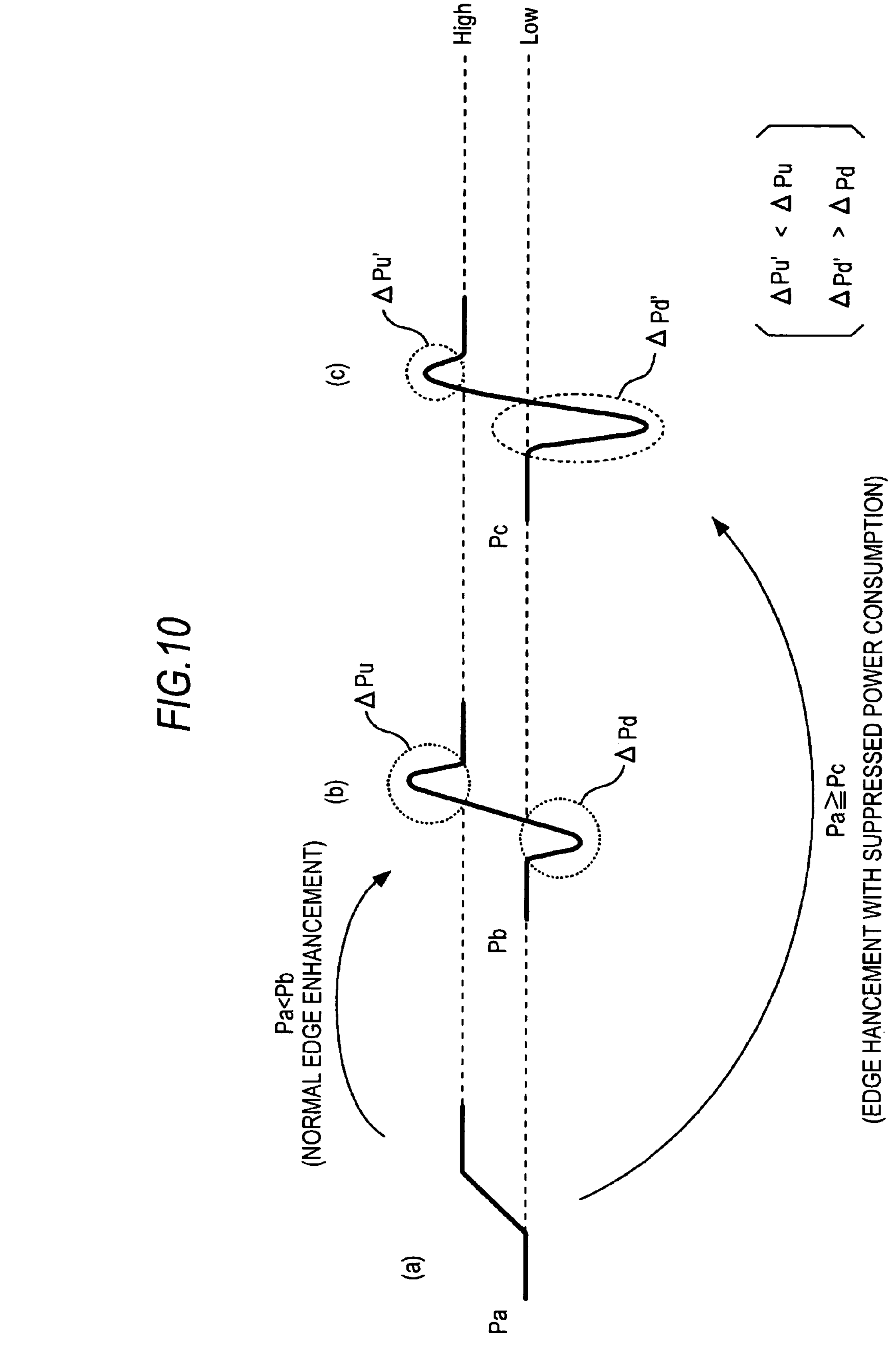
FIG. 10 is an explanatory view of effects of edge enhancement for suppression of power consumption according to an embodiment of the invention.

For example, it is assumed that there is an edge from the low level to the high level at a point on the screen, like (a) in FIG. 10.

In contrast, if normal edge enhancement processing is performed, like (b) in FIG. 10, the preshoot is added to the low level, and the overshoot is added to the high level (in this case, the edge amounts of the preshoot and the overshoot are identical).

In such a case, the gamma characteristic is close to the power of 2.2 (larger than the power of 1), as described above. For this reason, power in one step of the plus edge will become higher than power in one step of the minus edge.

That is, let the decrease in power of the minus edge be ΔPd and the increase in power of the plus edge be ΔPu, then, it is obvious that the relationship ΔPu>ΔPd is established, and the normal edge enhancement processing is accompanied by an increase in power consumption, as shown in FIG. 10.

Thus, let power consumption before edge enhancement be Pa and power consumption after edge enhancement be Pb, then, the relationship Pa<Pb is established.

In contrast, in this embodiment, edge enhancement is carried out while an increase in power consumption is suppressed. That is, like (c) of FIG. 10, the peak-to-peak of the total edge waveform is maintained in the same range or more, so while the edge enhancement effect is maintained, the edge amount in the plus direction is adjusted to be decreased, and the edge amount in the minus direction is adjusted to be increased. Therefore, an increase in power consumption is reliably suppressed.

In (c) of FIG. 10, an increase in power ΔPu' is suppressed such that the relationship ΔPu'<ΔPu is established, and a decrease in power ΔPd' is controlled such that the relationship ΔPd'>ΔPd is established. Note here that if adjustment is made such that the relationship ΔPu'ΔPd' is established, the relationship Pa≥Pc (Pc is power consumption after the processing for edge enhancement with suppressed power consumption) can be realized.

That is, the nonlinear function correction circuit 24*a* generates a vertically asymmetric edge waveform shown in FIG. 10 by the correction processing, and the adder circuit 22 adds the edge waveform to the display data signal, so power consumption can be suppressed or reduced while the edge enhancement effect can be maintained.

In order to realize the correction processing of the edge component waveform by the nonlinear function correction circuit 24*a*, the edge control coefficient determination unit 26 and the nonlinear function correction circuit 24*a* perform processing described below.

Figure 11:
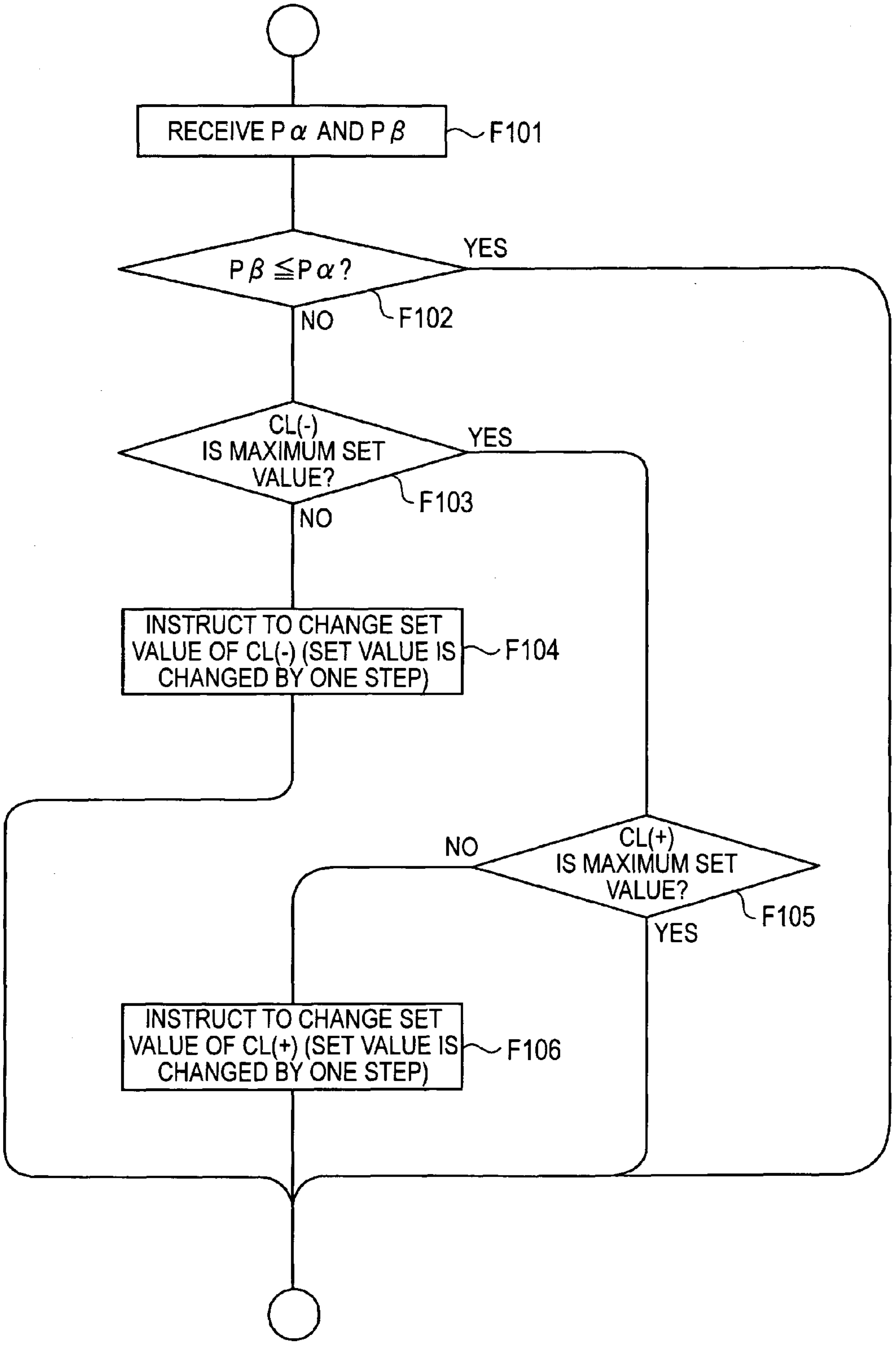
FIG. 11 is a flowchart of processing of an edge control coefficient determination unit according to an embodiment of the invention.

FIG. 11 shows the processing in the edge control coefficient determination unit 26. FIG. 11 shows an example of the processing which is executed by the edge control coefficient determination unit 26 for each frame period.

The edge control coefficient determination unit 26 controls the upper clip level and the lower clip level of the nonlinear function correction circuit 24*a* in the edge amount variable unit 24 by the coefficient control signal KC, as described above.

In Step F101, the edge control coefficient determination unit 26 first receives the light-emission power consumption Pα and Pβ calculated by the power consumption calculation unit 25. In Step F102, comparison is carried out between the light-emission power consumption Pα and Pβ.

When the relationship Pβ≤Pα is not established, that is, when the light-emission power consumption Pβ caused by the display data signal Dout is higher than the light-emission power consumption Pα caused by the display data signal Din, the processing of the edge control coefficient determination unit 26 progresses from Step F102 to Step F103. The progress of the processing to Step F103 means a state where power consumption is increasing due to edge addition.

In Step F103, the edge control coefficient determination unit 26 confirms whether or not the lower clip level CL(−) reaches the maximum set value CD10 described in FIG. 7A. That is, it is confirmed whether or not the lower clip level CL(−) cannot be decreased further.

If the lower clip level CL(−) has not reached the maximum set value, the edge control coefficient determination unit 26 progresses the processing to Step F104. Then, the coefficient control signal KC which instructs to change the set value of the lower clip level CL(−) by one step is generated, and supplied to the nonlinear function correction circuit 24*a* in the edge amount variable unit 24. Thus, the processing for the current frame period ends.

When it is determined in Step F103 that the lower clip level CL(−) has already reached the maximum set value, the edge control coefficient determination unit 26 progresses the processing to Step F105. In Step F105, the edge control coefficient determination unit 26 confirms whether or not the upper clip level CL(+) reaches the maximum set value CU10 described with reference to FIG. 7A. That is, it is confirmed whether or not the upper clip level CL(+) cannot be decreased further.

If the upper clip level CL(+) has not reached the maximum set value, the edge control coefficient determination unit 26 progresses the processing to Step F106. Then, the coefficient control signal KC which instructs to change the set value of the upper clip level CL(+) by one step is generated and supplied to the nonlinear function correction circuit 24*a* in the edge amount variable unit 24. Thus, the processing for the current frame period ends.

When it is determined in Step F105 that the upper clip level CL(+) has also reached the maximum set value, further control is impossible, so variable control is not performed and the processing for the current frame period ends.

When it is determined in Step F102 that the relationship Pβ≤Pα is established, that is, when the light-emission power consumption Pβ caused by the display data signal Dout is lower than (or identical to) the light-emission power consumption Pα caused by the display data signal Din, there is no increase in power consumption due to edge addition. In this case, further control is not required, so in Step F102, the processing for the current frame period ends.

The processing example shown in FIG. 11 is configured such that, when the light-emission power consumption Pβ caused by the display data signal Dout is higher than the light-emission power consumption Pα caused by the display data signal Din, the coefficient control signal KC is generated so as to reduce the light-emission power consumption Pβ for the display data signal Dout.

In this case, the nonlinear function correction circuit 24*a* decrease the lower clip level CL(−) by one step. Even though the lower clip level CL (−) has reached the maximum set value CD10, when the light-emission power consumption Pβ caused by the display data signal Dout is higher than the light-emission power consumption Pα caused by the display data signal Din, the upper clip level CL(+) is decreased by one step. This processing is performed such that the light-emission power consumption Pβ is equal to or lower than the light-emission power consumption Pa.

That is, the coefficient control signal KC is generated so as to preferentially variably control the clip level in the minus direction of the edge component to be decreased, and if needed after the clip level in the minus direction is decreased to a predetermined level, to variably control the clip level in the plus direction to be decreased.

FIGS. 12A and 12B show examples of, control of set values by the coefficient control signal KC.

FIGS. 12A and 12B show examples of the set values of the lower clip level CL(−) and the upper clip level CL(+). For example, it is assumed that the clip level is set as an 8-bit value.

As described with reference to FIGS. 7A to 7C, as the set value of the lower clip level CL(−), the ten steps of CD1 to CD10 are variably controlled. Further, as the set value of the upper clip level CL(+), the ten steps of CU1 to CU10 are variably controlled.

In Step F104, the edge control coefficient determination unit 26 indicates one of CD1 to CD10 by the coefficient control signal KC. In Step F106, one of CU1 to CU10 is indicated by the coefficient control signal KC.

Figure 13A:
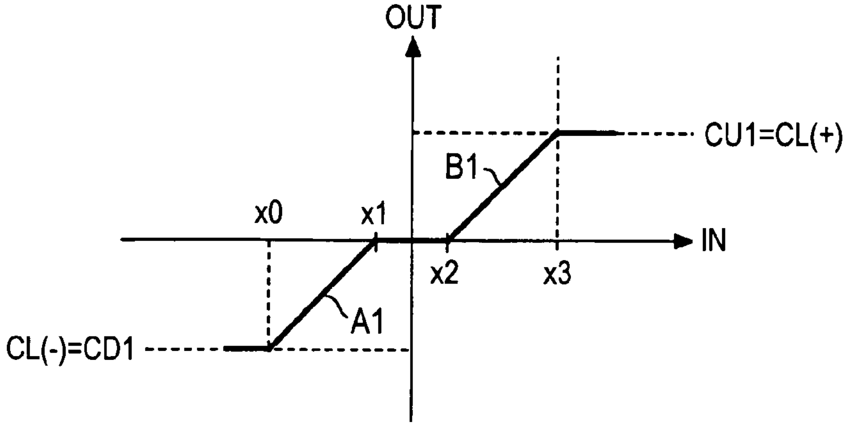
FIGS. 13A to 13C are explanatory views of changes in the set values of nonlinear function correction characteristics according to an embodiment of the invention.

The edge control coefficient determination unit 26 controls the upper clip level CL(+) and the lower clip level CL(−) of the nonlinear function correction circuit 24*a* such that the upper clip level CL(+) and the lower clip level CL(−) are set to CU1 and CD1 as default values, as shown in FIG. 13A. For example, as shown in FIGS. 12A and 12B, it is assumed that the relationship CD1=CU1="63" is established.

As shown in FIG. 12A, with regard to the lower clip level CL(−), CD2 is set to a value 1.25 times larger than the default value CD1, that is, the value "63", CD3 is set to a value 1.50 times larger than the value 63, . . . , CD10 is set to a value 3.25 times larger than the value "63".

Further, as shown in FIG. 12B, with regard to the upper clip level CL(+), CU2 is set to a value 0.9 times larger than the default value CU1 that is, the value "63", CU3 is set to a value 0.8 times larger than the value "63", . . . , and CU10 is set to a value 0.1 times larger than the value "63".

Figure 13B:
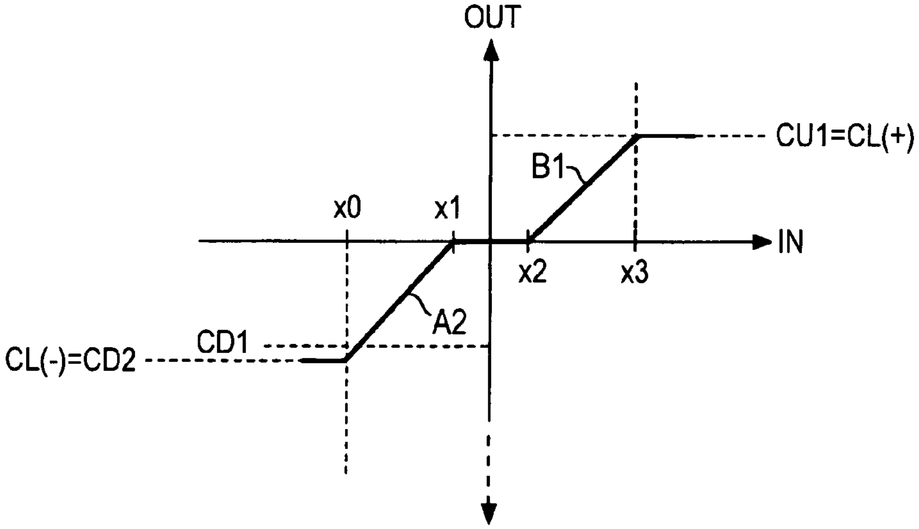

When the processing progresses from the initial state to Step F104, the edge control coefficient determination unit 26 generates the coefficient control signal KC indicating CD2 so as to change the lower clip level CL(−) by one step. For example, the lower clip level CL(−) of 63×1.25=78.75 is indicated. Thus, the correction characteristic becomes as shown in FIG. 13B by the below-described processing in the nonlinear function correction circuit 24*a*. For this reason, the correction processing causes an increase in the minus-side edge amount, and the light-emission power consumption Pβ caused by the display data signal Dout is controlled so as to be suppressed on the principle described with reference to FIG. 9.

The lower clip level CL(−) is decreased in sequence of CD3→CD4→CD5→ . . . for each frame period until the light-emission power consumption Pβ is sufficiently suppressed.

Figure 13C:
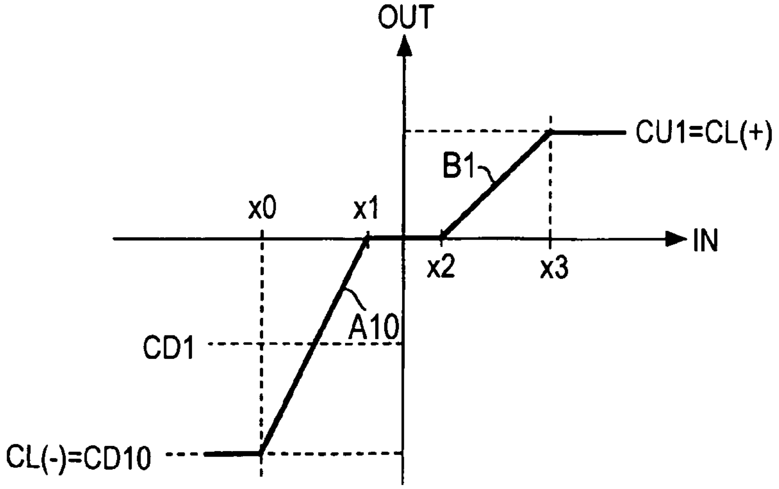
Figure 14A:
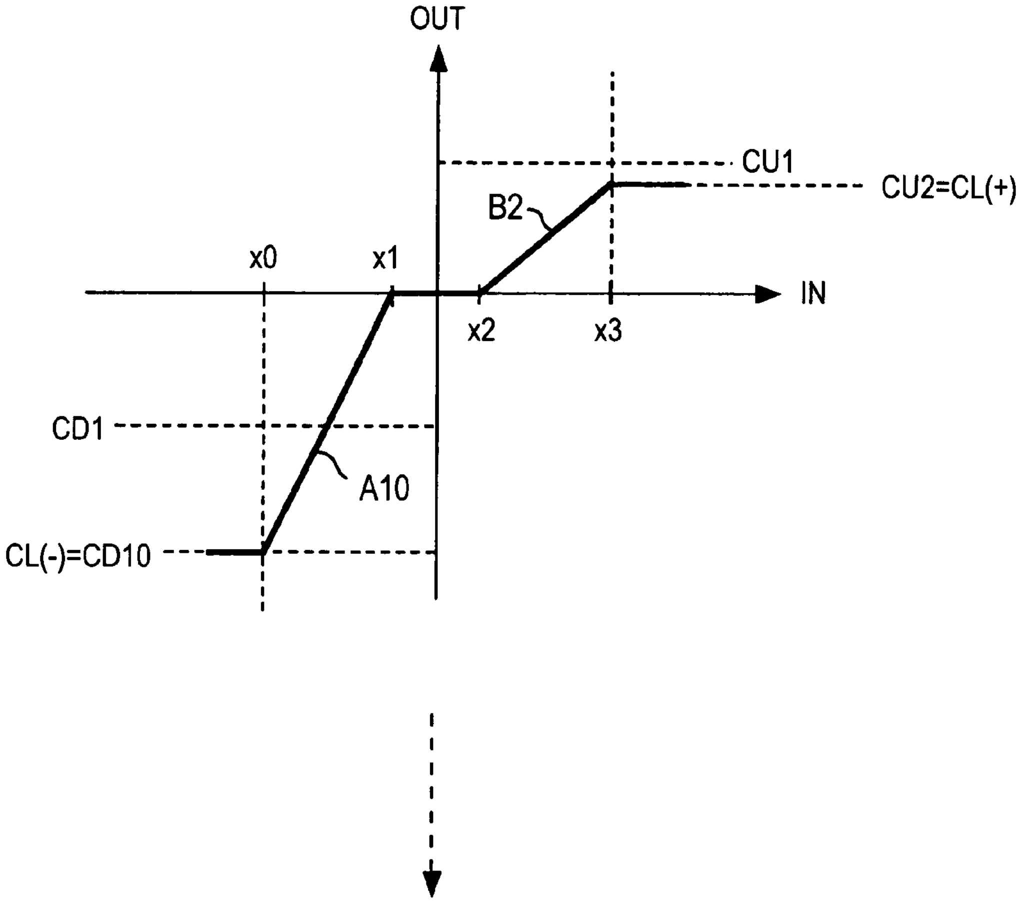
FIGS. 14A and 14B are explanatory views of changes in the set values of nonlinear function correction characteristics according to an embodiment of the invention.

As shown in FIG. 13C, even though the lower clip level CL(−) is decreased to CD10, if the light-emission power consumption Pβ has not yet been sufficiently suppressed, the upper clip level CL(+) is decreased from the next frame period. The coefficient control signal KC is generated which instructs to change the upper clip level CL(+) from CD1 to CD2. For example, the upper clip level CL(+) of 63×0.9=56.7 is indicated. Thus, the correction characteristic of the nonlinear function correction circuit 24*a* is as shown in FIG. 14A, and the correction processing causes a reduction in the plus-side edge amount. Similarly, the light-emission power consumption Pβ caused by the display data signal Dout is controlled so as to be suppressed on the principle described with reference to FIG. 9.

If the light-emission power consumption Pβ is not sufficiently suppressed, the upper clip level CL(+) is decreased in sequence of CU3→CU4→CU5→ . . . for each frame period.

Figure 14B:
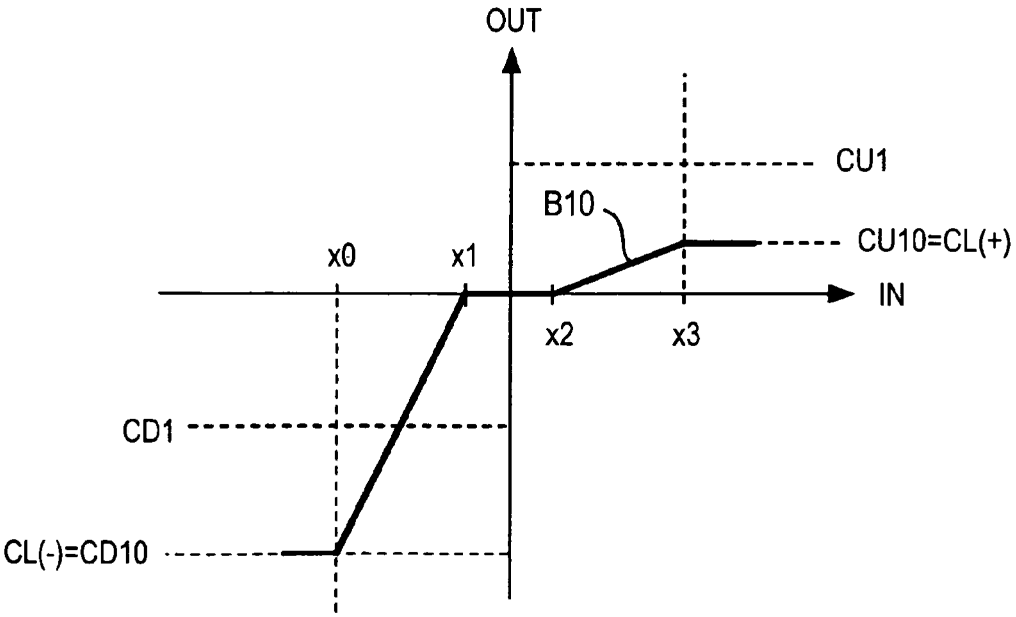

For example, as shown in FIG. 14B, control is performed until the upper clip level CL(+) becomes the maximum set value CD10. Even in this state, if the light-emission power consumption Pβ has not yet been sufficiently suppressed, as described above, the processing does not progress from Step F105 of FIG. 11 to Step F106, and control is aborted. Meanwhile, when the clip level variable setting ranges of FIGS. 12A and 12B are appropriately set, it may be considered that the control abortion state hardly ever occurs.

The edge control coefficient determination unit 26 supplies the coefficient control signal KC to the nonlinear function correction circuit 24*a* so as to perform the above-described setting control of the clip level.

The processing of the nonlinear function correction circuit 24*a* will be described below.

Figure 15:
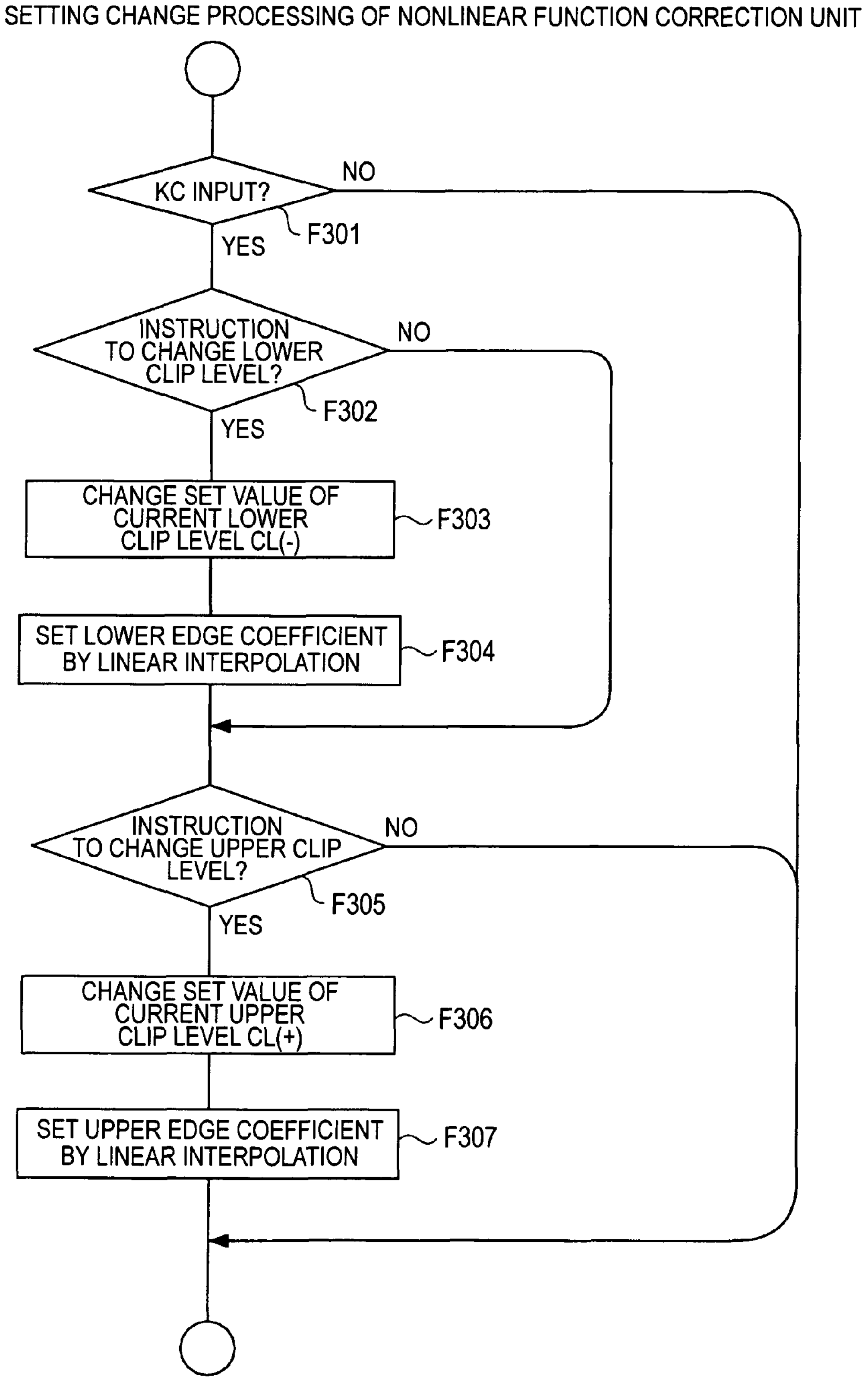
FIG. 15 is a flowchart of set value change processing of a nonlinear function correction unit according to an embodiment of the invention.

FIG. 15 shows processing when the nonlinear function correction circuit 24*a* changes the set value in accordance with the coefficient control signal KC.

The nonlinear function correction circuit 24*a* performs the processing of FIG. 15 such that the edge control coefficient determination unit 26 generates the coefficient control signal KC by the processing of FIG. 11.

That is, after the coefficient control signal KC is input, the nonlinear function correction circuit 24*a* progresses the processing of FIG. 15 from Step F301 to Step F302.

In Step F302, the nonlinear function correction circuit 24*a* confirms whether or not the setting instruction by the coefficient control signal KC is an instruction to change the set value of the lower clip level CL(−).

When the edge control coefficient determination unit 26 has generated the coefficient control signal KC in Step F104 of FIG. 11, the coefficient control signal KC instructs to change the set value of the lower clip level CL(−). In this case, the nonlinear function correction circuit 24*a* recognizes that the coefficient control signal KC instructs to change the set value of the lower clip level CL(−). Thus, the processing progresses to Step F303.

In Step F303, the nonlinear function correction circuit 24*a* changes the set value of the lower clip level CL(−). For example, if the lower clip level CL(−) is still in the initial set state shown in FIG. 13A, the lower clip level CL(−) is changed to CD2, as shown in FIG. 13B.

After the set value of the lower clip level CL(−) is changed, in Step F304, the nonlinear function correction circuit 24*a* sets a coefficient to be given the lower edge component by linear interpolation.

The coefficient setting will be described.

For example, in the initial state shown in FIG. 13A, the lower clip level CL(−) is CD1 and the upper clip level CL(+) is CU1.

In FIG. 13A, the range of x1 and x2 on the input axis (horizontal axis) is the coring range described with reference to FIG. 6B.

The minus-side edge waveform gives a gain corresponding to a slope A1 in the range of x0 to x1, and the lower clip level CL(−) is fixed to CD1 and output in the range of equal to or smaller than x0. In other words, the gain corresponding to the slope A1 is obtained by linear interpolation between the coordinate (x1,0) and the coordinate (x0,CD1).

Similarly, the plus-side edge waveform gives a gain corresponding to a slope B1 in the range of x2 to x3, and the upper clip level CL(+) is fixed to CU1 and output in the range of equal to or larger than x3. That is, the gain corresponding to the slope B1 is obtained by linear interpolation between the coordinate (x2,0) and the coordinate (x3,CU1).

When the set value of the lower clip level CL (−) or the upper clip level CL(+) is changed, the coefficient is set by linear interpolation in the same manner.

When in Step F303, the lower clip level CL (−) is changed from CD1 to CD2, in Step F304, a coefficient corresponding to a slope A2 of FIG. 13B is set. In this case, the coefficient corresponding to the slope A2 is obtained by linear interpolation between the coordinate (x1,0) and the coordinate (x0, CD2).

After the nonlinear function correction circuit 24*a* performs processing with the change in the set value of the lower clip level CL (−), the processing progresses to Step F305.

Next, the nonlinear function correction circuit 24*a* confirms whether or not the setting instruction by the coefficient control signal KC is an instruction to change the set value of the upper clip level CL(+).

As shown in FIG. 11, when the edge control coefficient determination unit 26 performs control such that the lower clip level CL(−) is preferentially decreased, and if needed after the lower clip level CL (−) is decreased to a predetermined level, the upper clip level CL(+) is decreased, the instruction to change the set value of the lower clip level CL(−) and the instruction to change the set value of the upper clip level CL(+) are not generated at the same time.

Therefore, as shown in FIG. 13C, until the lower clip level CL(−) becomes CD10, in Step F305, the nonlinear function correction circuit 24*a* confirms that the coefficient control signal KC does not instruct to change to the set value of the upper clip level CL(+). Thus, the processing FIG. 15 ends.

Meanwhile, after the state of FIG. 13C has been reached, when the edge control coefficient determination unit 26 generates the coefficient control signal KC in Step F106 of FIG. 11, the processing of the nonlinear function correction circuit 24*a* is performed as follows.

In this case, the coefficient control signal KC instructs to change the set value of the upper clip level CL(+), so the processing of FIG. 15 progresses in sequence of Steps F301→F302→F305→F306.

In Step F306, the nonlinear function correction circuit 24*a* changes the set value of the upper clip level CL(+). For example, if the upper clip level CL(+) is still in the initial set state shown in FIG. 13C, the upper clip level CL(+) is changed to CU2, as shown in FIG. 14A.

After the set value of the upper clip level CL(+) is changed, in Step F307, the nonlinear function correction circuit 24*a* sets a coefficient to be given to the upper edge component by linear interpolation. That is, a coefficient corresponding to a slope B2 of FIG. 14A is set.

As shown in FIG. 15, the nonlinear function correction circuit 24*a* changes the set value in accordance with the coefficient control signal KC from the edge control coefficient determination unit 26. In this set state, nonlinear correction processing is performed for each frame period.

Figure 16:
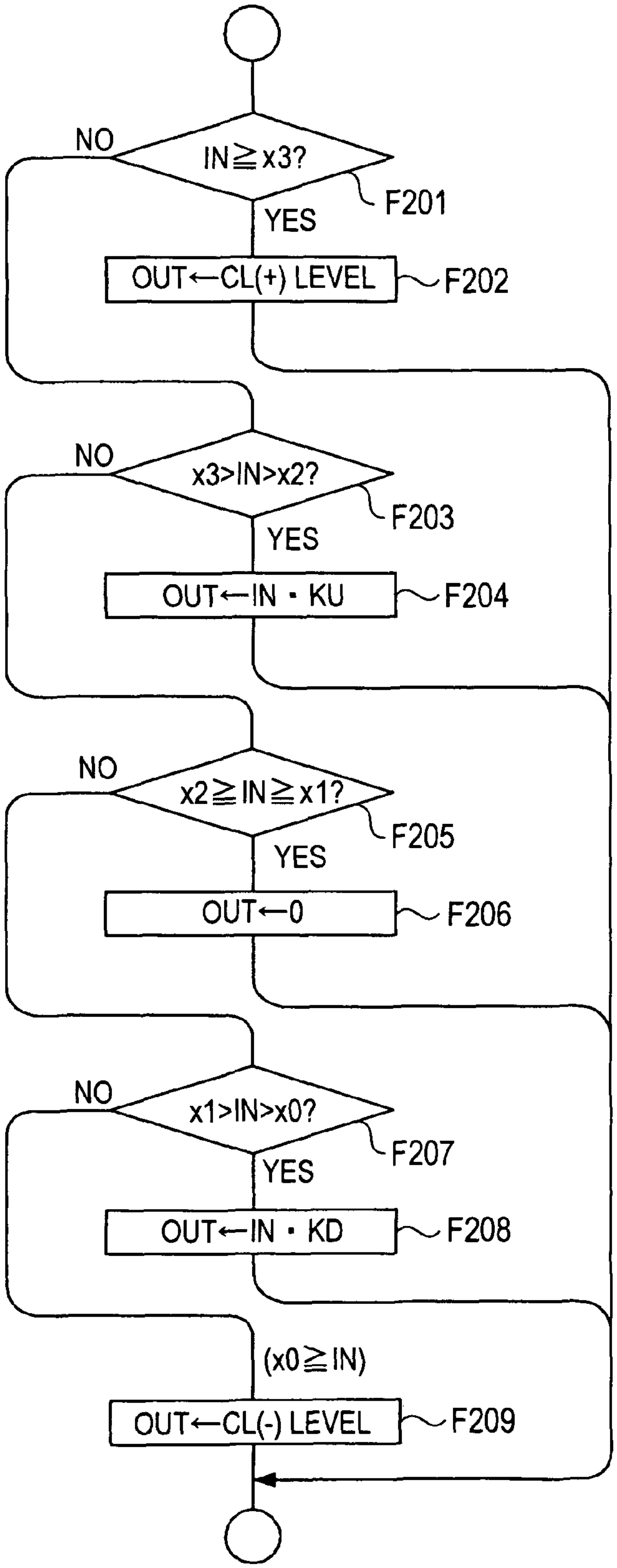
FIG. 16 is a flowchart of nonlinear function correction processing according to an embodiment of the invention.

FIG. 16 shows the nonlinear function correction processing. The nonlinear function correction circuit 24*a* corrects an edge component waveform (input value IN) subjected to secondary differential input from the edge extraction filter 23 by the processing of FIG. 16. Note that x0 to x3 of FIG. 16 represents the values on the input axis of FIGS. 13A to 13C, and 14A and 14B.

When the input value IN is equal to or larger than x3, an output value OUT is set to the value of the upper clip level CL(+) at that time (F201→F202).

When the input value IN satisfies the condition x3>IN>x2, the output value OUT is set to a value which is obtained by multiplying the input value IN by a plus-side edge coefficient KU at that time (F203→F204). The plus-side edge coefficient KU is a coefficient value which corresponds to the slope B1, B2, . . . , or B10 in FIGS. 13A to 13C, and 14A and 14B, and is set in Step F307 of FIG. 15.

When the input value IN satisfies the condition x2≥IN≥x1, this corresponds to the coring range, so the output value OUT is set to 0 (F205→F206).

When the input value IN satisfies the condition x1>IN>x0, the output value OUT is set to a value which is obtained by multiplying the input value IN by a minus-side edge coefficient KD at that time (F207→F208). The minus-side edge coefficient KD is a coefficient value which corresponds to the slope A1, A2, . . . , or A10 in FIGS. 13A to 13C, and 14A and 14B, and is set in Step F304 of FIG. 15.

Otherwise, that is, when the input value IN is equal to or smaller than x0, the output value OUT is set to the value of the lower clip level CL(−) at that time (F207→F209).

Such correction processing is performed such that the edge component which is added to the display data signal by the adder circuit 22 is corrected in accordance with the correction characteristic at that time (the correction characteristic which is changed in the range of FIGS. 13A to 14B).

When this happens, as shown in (c) of FIG. 10, the vertically asymmetric edge waveform is obtained, and control is performed until the condition Pα≥Pβ is satisfied.

Therefore, even though edge enhancement is performed, an increase in power consumption of the organic EL display panel module 3 is suppressed. As a result, the contrast improvement effect can be maintained, so an increase in power consumption can be suppressed while degradation in visibility can be suppressed.

Alternatively, if control is performed until the condition Pα>Pβ, not Pα≥Pβ, is satisfied, a reduction in power consumption can be actively achieved.

In this example, the set value of the lower clip level CL(−) is preferentially changed when the processing of FIG. 11 is performed. That is, the minus-side edge waveform level is preferentially decreased over the plus-side edge waveform level. This is effective in that the edge enhancement effect is reduced as little as possible. This is because the higher the plus-side edge level is, the more easily the contrast feeling in the image is obtained.

[4. Another Example of Edge Control Coefficient Determination Processing]

The generation processing of the coefficient control signal KC by the edge control coefficient determination unit 26 may be realized in various ways other than FIG. 11. Description will be given below for various generation processing of the coefficient control signal KC.

Figure 17:
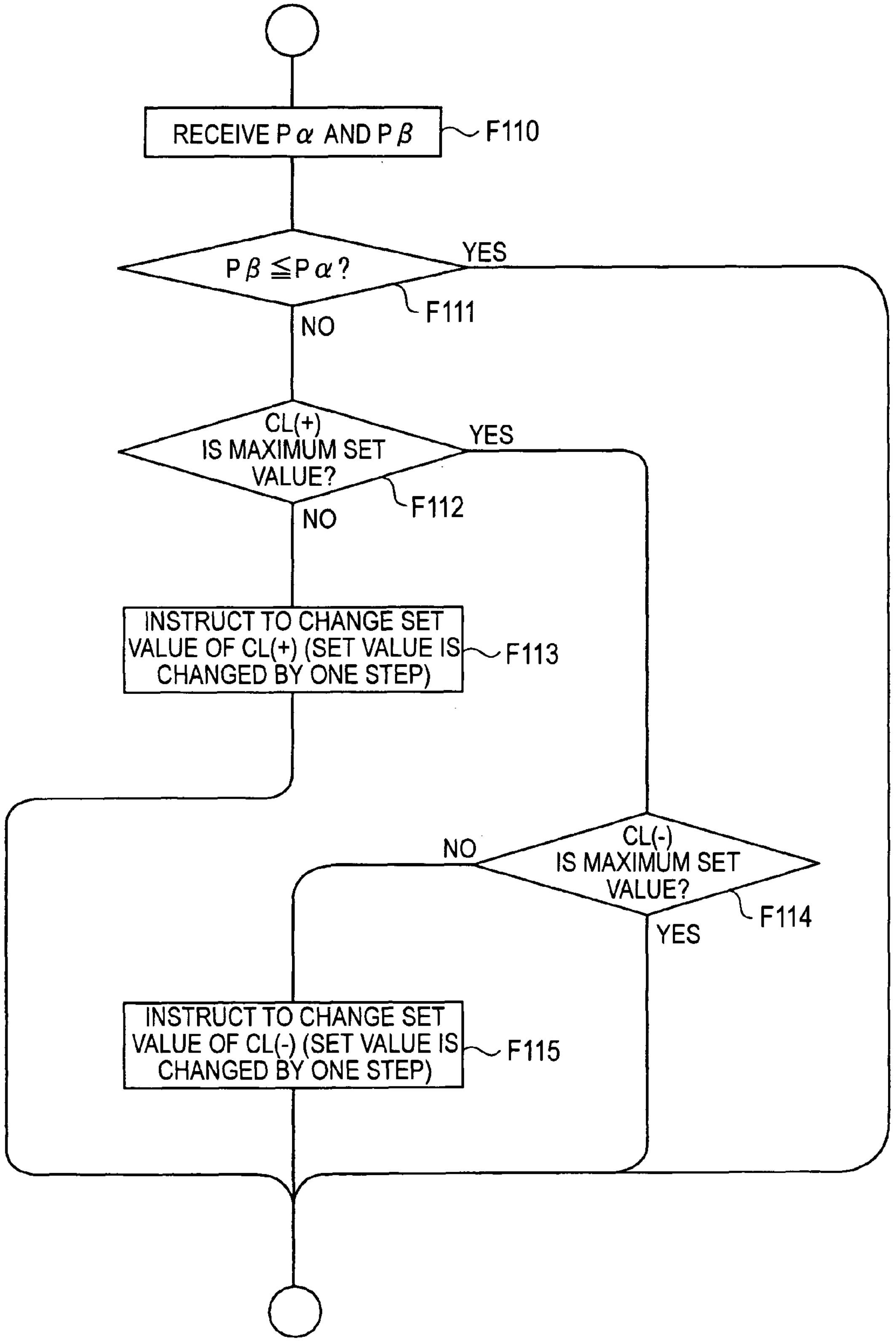
FIG. 17 is a flowchart of another example of processing of an edge control coefficient determination unit according to an embodiment of the invention.

FIG. 17 shows, contrary to FIG. 11, an example where the clip level in the plus direction of the edge component is preferentially variably controlled so as to be decreased, and if needed after the clip level in the plus direction is decreased to a predetermined level, the clip level in the minus direction of the edge component is variably controlled so as to be decreased.

As described above, the processing of FIG. 11 is suitably performed in terms of the contrast feeling, but the method of FIG. 17 may be considered in terms of power consumption.

Referring to FIG. 17, in Step F110, the edge control coefficient determination unit 26 first receives the light-emission power consumption Pα and Pβ calculated by the power consumption calculation unit 25. In Step F111, comparison is carried out between the light-emission power consumption Pα and Pβ.

When the relationship Pβ≤Pα is not established, that is, when the light-emission power consumption Pβ caused by the display data signal Dout is higher than the light-emission power consumption Pα caused by the display data signal Din, the processing of the edge control coefficient determination unit 26 progresses from Step F111 to Step F112.

In Step F103, the edge control coefficient determination unit 26 confirms whether or not the lower clip level CL(+) reaches the maximum set value CU10 described with reference to FIG. 7A. That is, it is confirmed whether or not the upper clip level CL(+) cannot be decreased further.

If the upper clip level CL(+) has not reached the maximum set value, the edge control coefficient determination unit 26 progresses the processing to Step F113. Then, the coefficient control signal KC which instructs to change the set value of the upper clip level CL(+) by one step is generated and supplied to the nonlinear function correction circuit 24*a* in the edge amount variable unit 24. Thus, the processing for the current frame period ends.

When it is determined in Step F112 that the upper clip level CL(+) has already reached the maximum set value, the edge control coefficient determination unit 26 progresses the processing to Step F114. In Step F114, the edge control coefficient determination unit 26 confirms whether or not the lower clip level CL(−) reaches the maximum set value CD10 described with reference to FIG. 7A. That is, it is confirmed whether or not the lower clip level CL (−) cannot be decreased further.

If the lower clip level CL (−) has not reached the maximum set value, the edge control coefficient determination unit 26 progresses the processing to Step F115. Then, the coefficient control signal KC which instructs to change the set value of the lower clip level CL (−) by one step is generated and supplied to the nonlinear function correction circuit 24*a* in the edge amount variable unit 24. Thus, the processing for the current frame period ends.

When it is determined in Step F114 that the lower clip level CL(−) has also reached the maximum set value, further control is impossible, so variable control is not performed and the processing for the current frame period ends.

When it is determined in Step F111 that the relationship Pβ≤Pα is established, that is, when the light-emission power consumption Pβ caused by the display data signal Dout is lower than (or identical to) the light-emission power consumption Pα caused by the display data signal Din, there is no increase in power consumption due to edge addition. In this case, further control is not required, so in Step F111, the processing for the current frame period ends.

With such processing, an increase in power consumption can be suppressed while the contrast feeling improvement effect by edge addition can be maintained.

Figure 18:
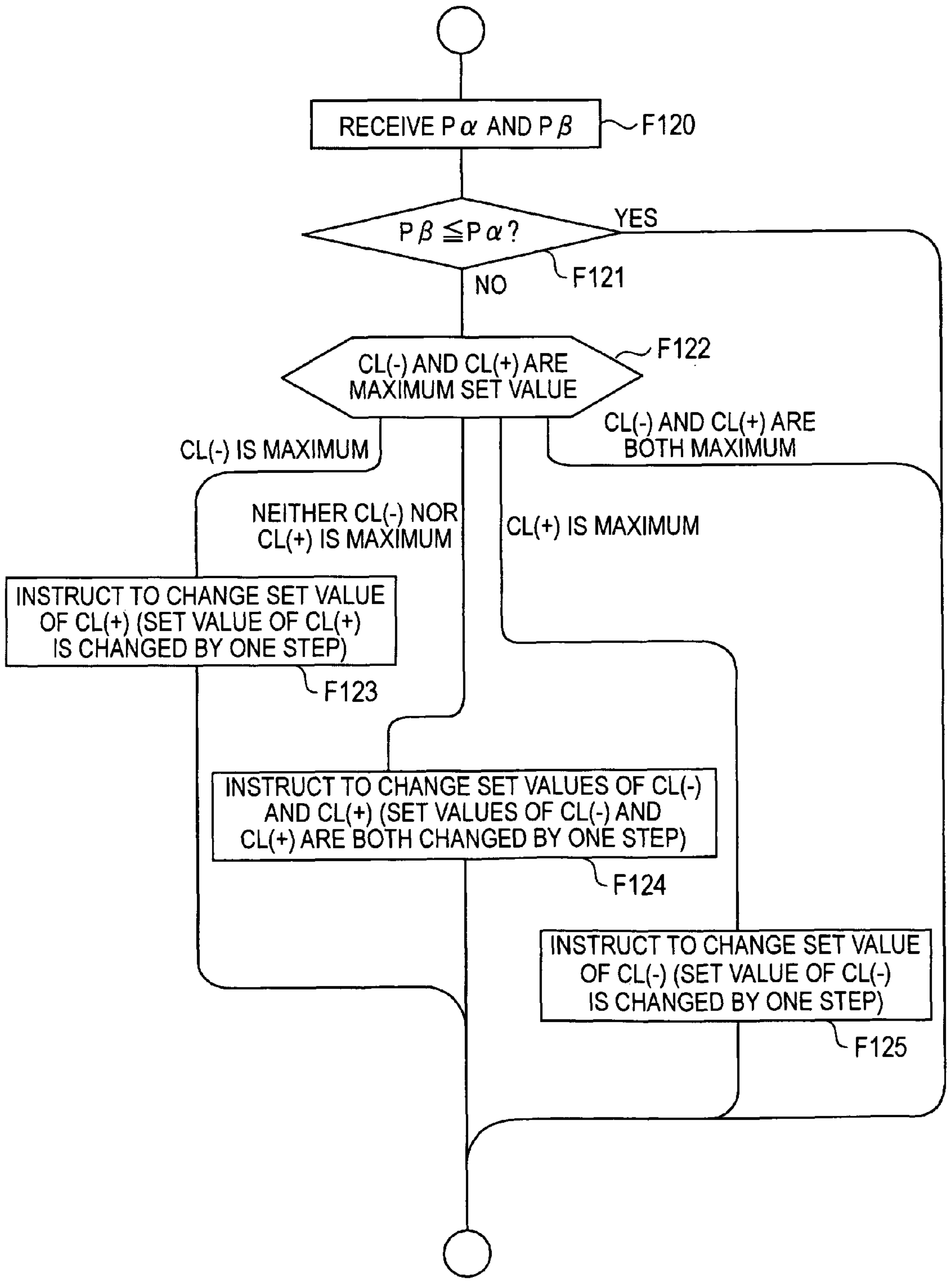
FIG. 18 is a flowchart of another example of processing of an edge control coefficient determination unit according to an embodiment of the invention.

Next, FIG. 18 shows processing for changing the set values of the lower clip level CL(−) and the upper clip level CL(+) at the same time.

Referring to FIG. 18, in Step F120, the edge control coefficient determination unit 26 first receives the light-emission power consumption Pα and Pβ calculated by the power consumption calculation unit 25. In Step F121, comparison is carried out between the light-emission power consumption Pα and Pβ.

When the relationship Pβ≤Pα is established, the set value does not need to be changed, so the processing ends.

When the relationship Pβ≤Pα is not established, that is, when the light-emission power consumption Pβ caused by the display data signal Dout is higher than the light-emission power consumption Pα caused by the display data signal Din, the processing of the edge control coefficient determination unit 26 progresses from Step F121 to Step F122.

In Step F122, the edge control coefficient determination unit 26 confirms whether or not the lower clip level CL(−) and the upper clip level CL(+) respectively reach the maximum set values CD10 and CU10.

If both of the lower clip level CL(−) and the upper clip level CL(+) have not reached the maximum set values, the processing progresses to Step F124. Then, the edge control coefficient determination unit 26 generates the coefficient control signal KC which instructs to change the set values of the lower clip level CL(−) and the upper clip level CL(+) by one step, and supplies the coefficient control signal KC to the nonlinear function correction circuit 24*a* in the edge amount variable unit 24. Thus, the processing for the current frame period ends.

If both of the lower clip level CL(−) and the upper clip level CL(+) have reached the maximum set values, further change of the set values cannot be made, so in Step F122, the processing for the current frame period ends. That is, power consumption reduction control cannot be performed. Meanwhile, as described above, if the set value change range is appropriately designed, it may be considered that this state hardly ever occurs.

Like the example of FIG. 7A, when the number of variable steps of the upper clip level CL(+) and the number of variable steps of the lower clip level CL (−) are identical, for example, ten steps or the like, only the above-described case exists. Meanwhile, when the number of variable steps of the upper clip level CL(+) is set larger than the number of variable steps of the lower clip level CL (−), in Step F122, it may be determined that only the lower clip level CL(−) has reached the maximum set value.

In this case, the edge control coefficient determination unit 26 progresses to Step F123, generates the coefficient control signal KC which instructs to change the set value of the upper clip level CL(+) by one step, and supplies the coefficient control signal KC to the nonlinear function correction circuit 24*a* in the edge amount variable unit 24. Thus, the processing for the current frame period ends.

When the number of variable steps of the lower clip level CL(−) is set larger than the number of variable steps of the upper clip level CL(+), in Step F122, it may be determined that only the upper clip level CL(+) has reached the maximum set value.

In this case, the edge control coefficient determination unit 26 progresses to Step F125, generates the coefficient control signal KC which instructs to change the set value of the lower clip level CL(−) by one step, and supplies the coefficient control signal KC to the nonlinear function correction circuit 24*a* in the edge amount variable unit 24. Thus, the processing for the current frame period ends.

With the processing of FIG. 18, in Step F124, the upper clip level CL(+) and the lower clip level CL (−) are controlled so as to be decreased at the same time for each frame period. Therefore, an increase in power consumption can be suppressed while the contrast feeling improvement effect by edge addition can be maintained. Further, control can be rapidly performed until it is determined in Step F121 that the relationship Pβ≤Pα is established.

Figures 19A, 19B:
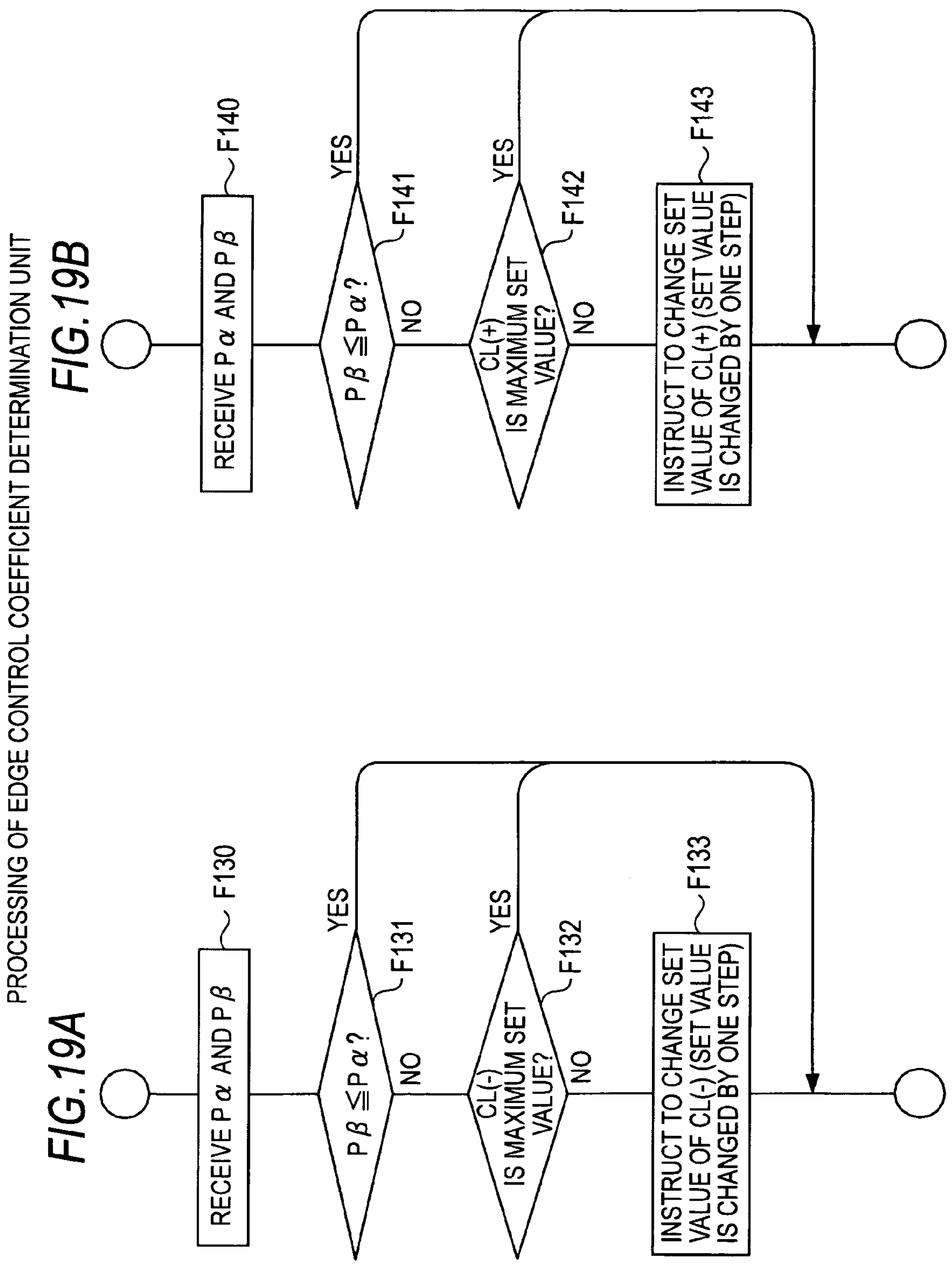
FIGS. 19A and 19B are flowcharts of another example of processing of an edge control coefficient determination unit according to an embodiment of the invention.

Like the processing examples of FIGS. 19A and 19B, either the set value of the lower clip level CL (−) or the set value of the upper clip level CL(+) may be changed.

With the processing example of FIG. 19A, in Step F130, the edge control coefficient determination unit 26 first receives the light-emission power consumption Pα and Pβ. In Step F131, comparison is carried out between the light-emission power consumption Pα and Pβ.

When the relationship Pβ≤Pα is established, the set value does not need to be changed, so the processing ends.

When the relationship Pβ≤Pα is not established, the edge control coefficient determination unit 26 progresses to Step F132, and confirms whether or not the lower clip level CL (−) reaches the maximum set value (for example, CD10).

If the lower clip level CL (−) has not reached the maximum set value, the processing progresses to Step F133. Then, the edge control coefficient determination unit 26 generates the coefficient control signal KC which instructs to change the set value of the lower clip level CL (−) by one step, and supplies the coefficient control signal KC to the nonlinear function correction circuit 24*a* in the edge amount variable unit 24. Thus, the processing for the current frame period ends.

If the lower clip level CL(−) has reached the maximum set value, further change of the set value cannot be made, so in Step F132, the processing for the current frame period ends.

With the processing example of FIG. 19B, in Step F140, the edge control coefficient determination unit 26 first receives the light-emission power consumption Pα and Pβ. In Step F141, comparison is carried out between the light-emission power consumption Pα and Pβ.

When the relationship Pβ≤Pα is established, the set value does not need to be changed, so the processing ends.

When the relationship Pβ≤Pα is not established, the edge control coefficient determination unit 26 progresses to Step F142, and confirms whether or not the upper clip level CL(+) reaches the maximum set value (for example, CU10).

If the upper clip level CL(+) has not reached the maximum set value, the processing progresses to Step F143. Then, the edge control coefficient determination unit 26 generates the coefficient control signal KC which instructs to change the set value of the upper clip level CL(+) by one step, and supplies the coefficient control signal KC to the nonlinear function correction circuit 24*a* in the edge amount variable unit 24. Thus, the processing for the current frame period ends.

If the upper clip level CL(+) has reached the maximum set value, further change of the set value cannot be made, so in Step F132, the processing for the current frame period ends.

With the processing of FIG. 19A or 19B, either the minus-side edge component or the plus-side edge component is corrected so as to suppress an increase in power consumption. Therefore, the processing is simplified.

[5. Modification]

Although the embodiment has been described, the invention is not limited to the embodiment, and various modifications may be made.

For example, with the generation processing of the coefficient control signal KC shown in FIGS. 11, 17, 18, 19A, and 19B, the set value of the lower clip level CL(−) or the upper clip level CL(+) is changed by one step. Alternatively, the set value may be instructed so as to be changed by multiple steps under one-time control.

In this case, instead of simple comparison between the light-emission power consumption Pα and Pβ, a difference in power consumption or a ratio of power consumption may be calculated. Then, the lower clip level CL (−) or the upper clip level CL(+), which is used to decrease the light-emission power consumption Pβ caused by the display data signal Dout equal to or lower than the light-emission power consumption Pα caused by the display data signal Din, may be calculated on the basis of the difference in power consumption or the ratio of power consumption under one-time control. As a result, the coefficient control signal KC may be generated which designates the calculated lower clip level CL(−) or upper clip level CL(+). With this configuration, a target state can be reached under one-time control.

In the examples shown in FIGS. 11, 17, 18, 19A and 19B, the set value of the lower clip level CL (−) or the upper clip level CL(+) is constantly decreased. Basically, control is performed in such a manner, but when in a certain frame, the light-emission power consumption Pβ is lower than the light-emission power consumption Pα by a predetermined amount or more, the set value of the lower clip level CL(−) or the upper clip level CL(+) may be returned (increased). In particular, the plus-side edge component is desirably high in terms of improvement in the contrast feeling. Therefore, when the upper clip level CL(+) is decreased unduly, it is desirable to return (increase) the level in terms of image quality.

In the example of FIG. 11, the lower clip level CL(−) is preferentially changed, and in the example of FIG. 17, the upper clip level CL(+) is preferentially changed. Alternatively, a processing example may be considered in which the set values of the lower clip level CL(−) and the upper clip level CL(+) are sequentially and alternately changed for each frame period.

In Step F102 of FIG. 11, Step F111 of FIG. 17, Step F121 of FIG. 18, Step F131 of FIG. 19A, and Step F141 of FIG. 19B, determination is made on whether or not the relationship $P\beta \leq P\alpha$ is established, but determination may be made on whether or not the relationship $P\beta < P\alpha$ is established.

As described with reference to FIGS. 6A and 6B, the gain calculation unit 24*b* multiples the output of the nonlinear function correction circuit 24*a* by the edge amount control signal EC so as to control the level of the edge component, but the gain for the edge component may be a fixed value.

The light-emission power consumption $P\alpha$ and $P\beta$ are estimated, and the correction characteristic of the edge component is set on the basis of the light-emission power consumption $P\alpha$ and $P\beta$. Alternatively, the nonlinear function correction circuit 24*a* may correct the edge component waveform by a fixed characteristic, generate an asymmetric edge waveform, and add the asymmetric edge waveform to the display data signal Din.

For example, the fixed correction characteristic shown in FIG. 7C may be set.

The edge enhancement processing with suppressed power consumption of the foregoing embodiment and the normal edge enhancement processing may be switched in accordance with the user's usage or preference.

For example, when the edge enhancement processing with suppressed power consumption is performed, as described above, the correction characteristic of the nonlinear function correction circuit 24*a* is changed on the basis of the light-emission power consumption $P\alpha$ and $P\beta$. Meanwhile, when the user does not demand such a function, the nonlinear function correction circuit 24*a* constantly performs the processing on the basis of the default set values of FIG. 6B.

The present application contains subject matter related to that disclosed in Japanese Priority Patent Application JP 2008-318216 filed in the Japan Patent Office on Dec. 15, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A self-luminescent display device whose power consumption is dependent on a gradation level of a displayed image, the self-luminescent display device comprising:

an edge processing unit, which outputs a corrected display image, the corrected display image being generated by adding an edge component to a display data signal; and a display unit which displays an image depending on the corrected display image, wherein the edge component includes at least one of a minus direction component and a plus direction component, wherein respective magnitudes of the minus direction component and the plus direction component are variably set based on specific conditions, and wherein the specific conditions are based on the display data signal such that the magnitude of the minus direction component is greater when a gradation level of the display data signal is high than the magnitude of the minus direction component when a gradation level of the display data signal is low.

2. The self-luminescent display device according to claim 1, wherein the specific conditions are further based on a predicted power consumption amount, which depends on the display data signal, such that the magnitude of the minus direction component is greater when the predicted power consumption amount is high than the magnitude of the minus direction component when the predicted power consumption amount is low.

3. The self-luminescent display device according to claim 1, wherein the display unit comprises a plurality of pixel elements, each of the pixel elements including a drive transistor, a sampling transistor and a light emitting element driven by a current supply controlled by the drive transistor, and wherein a power consumption amount of the display unit is dependent on an intensity of light emitted by the light emitting elements.

4. A self-luminescent display device whose power consumption is dependent on a gradation level of a displayed image, the self-luminescent display device comprising:

an edge processing unit, which outputs a corrected display image, the corrected display image being generated by adding an edge component to a display data signal; and a display unit which displays an image depending on the corrected display image, wherein the edge component includes at least one of a minus direction component and a plus direction component, wherein respective magnitudes of the minus direction component and the plus direction component are variably set based on specific conditions, and wherein the specific conditions are based on the display data signal such that the magnitude of the plus direction component is smaller when a gradation level of the display data signal is high than the magnitude of the plus direction component when a gradation level of the display data signal is low.

5. The self-luminescent display device according to claim 4, wherein the specific conditions are further based on a predicted power consumption amount, which depends on the display data signal, such that a magnitude of the plus direction component is smaller when the predicted power consumption amount is high than the magnitude of the plus direction component when the predicted power consumption amount is low.

6. The self-luminescent display device according to claim 4, wherein the display unit comprises a plurality of pixel elements, each of the pixel elements including a drive transistor, a sampling transistor and a light emitting element driven by a current supply controlled by the drive transistor, and wherein a power consumption amount of the display unit is dependent on an intensity of light emitted by the light emitting elements.

7. A self-luminescent display device whose power consumption is dependent on a gradation level of a displayed image, the self-luminescent display device comprising:

an edge processing unit, which outputs a corrected display image, the corrected display image being generated by adding an edge component to a display data signal; and a display unit which displays an image depending on the corrected display image, wherein the edge component includes at least one of a minus direction component and a plus direction component, wherein respective magnitudes of the minus direction component and the plus direction component are variably set based on specific conditions, wherein the specific conditions are based on a gradation of the display data signal, wherein one of a plurality of minus direction levels is variably selected based on the specific conditions and one of a plurality of plus direction levels is variably selected based on the specific conditions, and wherein the magnitude of the minus direction component is determined according to the selected one of a plurality of minus direction levels and the magnitude of the plus direction component is set according to the selected one of a plurality of plus direction levels.

8. The self-luminescent display device according to claim 7, wherein the selected one of the plurality of minus direction levels reaches a predetermined minimum level before the selected one of the plurality of plus direction levels is varied from an initial plus direction level.

9. The self-luminescent display device according to claim 7, wherein the selected one of the plurality of minus direction levels is varied from an initial minus direction level preferentially compared to a variation of the selected one of the plurality of plus direction levels from an initial plus direction level.

10. A self-luminescent display device whose power consumption is dependent on a gradation level of a displayed image, the self-luminescent display device comprising:

an edge processing unit, which outputs a corrected display image, the corrected display image being generated by adding an edge component to a display data signal; and a display unit which displays an image depending on the corrected display image, wherein the edge component includes at least one of a minus direction component and a plus direction component, and wherein respective magnitudes of the minus direction component and the plus direction component are variably set based on specific conditions, wherein the display unit comprises a plurality of pixel elements, each of the pixel elements including a drive transistor, a sampling transistor and a light emitting element driven by a current supply controlled by the drive transistor, wherein a power consumption amount of the display unit is dependent on an intensity of light emitted by the light emitting elements, and wherein the specific conditions are based on at least an average value of a plurality of values respectively corresponding to an intensity of light emitted by each of the light emitting elements within an area in the display unit, where the average value corresponds to a predicted power consumption amount of the display unit.

11. The self-luminescent display device according to claim 10, wherein the specific conditions are further based on a selection which is switched by a user preference.

12. A display device comprising an edge processing unit and a display unit, wherein the edge processing unit comprises:

an extraction unit configured to extract an edge component of a display data signal;

a correction unit configured to carry out correction processing on the extracted edge component based on a control signal, and output a corrected edge component;

an adder unit configured to add the corrected edge component to the display data signal; and a signal generation unit configured to generate the control signal based on the display data signal and an output signal of the adder unit; and wherein the display unit is configured to display an image corresponding to the output signal of the adder unit.

13. The display device according to claim 12, wherein the signal generation unit generates the control signal based on:

a result of a calculation based on the display data signal, which corresponds to a predicted light-emission power consumption for a case in which the display unit displays an image that corresponds to the display data signal without processing by the edge processing unit, and a result of a calculation based the output signal of the adder unit, which corresponds to a predicted light-emission power consumption for a case in which the display unit displays an image that corresponds to the output signal of the adder unit.

14. The display device according to claim 12, wherein the correction unit is configured to set values for correction of a plus direction component and a minus direction of the edge components based on the control signal, and to then perform the correction processing according to the values for correction of the plus direction component and the minus direction of the edge components that were set.

15. The display device according to claim 12, wherein the correction processing includes applying clip levels in the plus and minus directions to the edge component, the clip levels in the plus and minus directions being variably set by the correction unit based on the control signal, and wherein the correction unit performs the correction processing by coefficient operation using a plus edge coefficient and a minus edge coefficient determined by the clip levels in the plus and minus directions, respectively.

16. The display device according to claim 15, wherein the clip levels are set such that the clip levels in the minus direction of the edge component are decreased to a predetermined level before the clip levels in the plus direction of the edge component are decreased below an initial value.

17. The display device according to claim 15, wherein the clip levels are set such that the clip levels in the plus direction of the edge component are decreased to a predetermined level before the clip levels in the minus direction of the edge component are decreased below an initial value.

18. The display device according to claim 15, wherein the clip levels in the plus and minus directions are set such that, when the clip levels in the plus direction of the edge component are decreased, the clip levels in the minus direction of the edge component are also decreased.

19. The display device according to claim 15, wherein the signal generation unit variably controls one of the clip levels in the plus and minus directions of the edge component in the correction unit by using the control signal.

* * * * *